United States Patent

Shimizu et al.

[11] Patent Number: 5,864,407
[45] Date of Patent: Jan. 26, 1999

[54] IMAGE PROCESSING SYSTEM

[75] Inventors: Katsuichi Shimizu, Kunitachi; Takehiko Shibata, Kokubunji; Yoshikazu Yokomizo, Kawagoe; Akira Suzuki, Kawasaki; Koichi Murakami, Yokohama; Tadashi Yoshida, Tokyo; Masaharu Tsukada, Kawasaki; Nao Nagashima; Ken Miyagi, both of Yokohama, all of Japan

[73] Assignee: Canon Kabushiki Kaisha, Tokyo, Japan

[21] Appl. No.: 326,342

[22] Filed: Oct. 20, 1994

Related U.S. Application Data

[63] Continuation of Ser. No. 27,591, Mar. 5, 1993, abandoned, which is a continuation of Ser. No. 668,145, Mar. 11, 1991, abandoned, which is a continuation of Ser. No. 401,482, Aug. 30, 1989, Pat. No. 5,008,760, which is a continuation of Ser. No. 884,677, Jul. 17, 1986, abandoned, which is a continuation of Ser. No. 647,414, Sep. 5, 1984, abandoned, which is a continuation of Ser. No. 647,414, Sep. 5, 1984, abandoned, which is a continuation of Ser. No. 311,864, Oct. 15, 1981, abandoned.

[30] Foreign Application Priority Data

| Oct. 17, 1980 | [JP] | Japan | 55-145293 |
| Oct. 31, 1980 | [JP] | Japan | 55-154464 |
| Dec. 16, 1980 | [JP] | Japan | 55-177677 |
| Dec. 16, 1980 | [JP] | Japan | 55-177678 |
| Dec. 16, 1980 | [JP] | Japan | 55-177679 |
| Dec. 16, 1980 | [JP] | Japan | 55-177680 |
| Dec. 16, 1980 | [JP] | Japan | 55-177681 |

[51] Int. Cl.$^6$ .................................................. H04N 1/387
[52] U.S. Cl. .......................................... 358/453; 358/448
[58] Field of Search ................................ 358/451, 452, 358/453, 443, 448, 450, 515; 355/243, 244

[56] References Cited

U.S. PATENT DOCUMENTS

| 3,828,319 | 8/1974 | Owen et al. | 340/172.5 |
| 3,976,982 | 8/1976 | Eiselen | 340/172.5 |
| 4,007,362 | 2/1977 | Sindermann | 358/453 |
| 4,189,744 | 2/1980 | Stern | 358/93 |
| 4,196,450 | 4/1980 | Miller et al. | 358/453 |
| 4,214,276 | 7/1980 | Pugsley et al. | 358/256 |
| 4,257,044 | 3/1981 | Fukuoka | 358/453 |
| 4,258,385 | 3/1981 | Greenberg et al. | 358/515 |
| 4,303,948 | 12/1981 | Arai et al. | 358/287 |
| 4,338,636 | 7/1982 | Yamada et al. | 358/452 |
| 4,345,276 | 8/1982 | Colomb | 358/258 |
| 4,417,805 | 11/1983 | Kishi | 355/244 |
| 4,495,521 | 1/1985 | Nagoh | 358/256 |
| 4,734,786 | 3/1988 | Minakawa et al. | 358/451 |
| 4,965,678 | 10/1990 | Yamada | 358/453 |

FOREIGN PATENT DOCUMENTS 5544282  3/1980  Japan .

OTHER PUBLICATIONS

*Mikroprozessoren und ihre Anwendungen*, Hilbert et al., pp. 15–19.

*Microprocessors, Electronic Book Series*, Altman, pp. 9–16.

*Primary Examiner*—Thomas D. Lee
*Attorney, Agent, or Firm*—Fitzpatrick, Cella, Harper & Scinto

[57] ABSTRACT

An image processing system of the invention has a reader which reads out an image of an original, a page memory which stores image information of the original in the form of electric signals, a disk memory which stores part or all of the image information in the disk memory and also stores image processing information, an image processing section, a digitizer for the operator to input the image processing information, a CRT which displays input information or corrections in convesation language, a DMA controller, and a printer. The image processing system of the invention is capable of DMA transfer without the intermediacy of a CPU. Fewer addresses are required for readout of the image information from the memory, and high speed image processing is achieved.

26 Claims, 30 Drawing Sheets

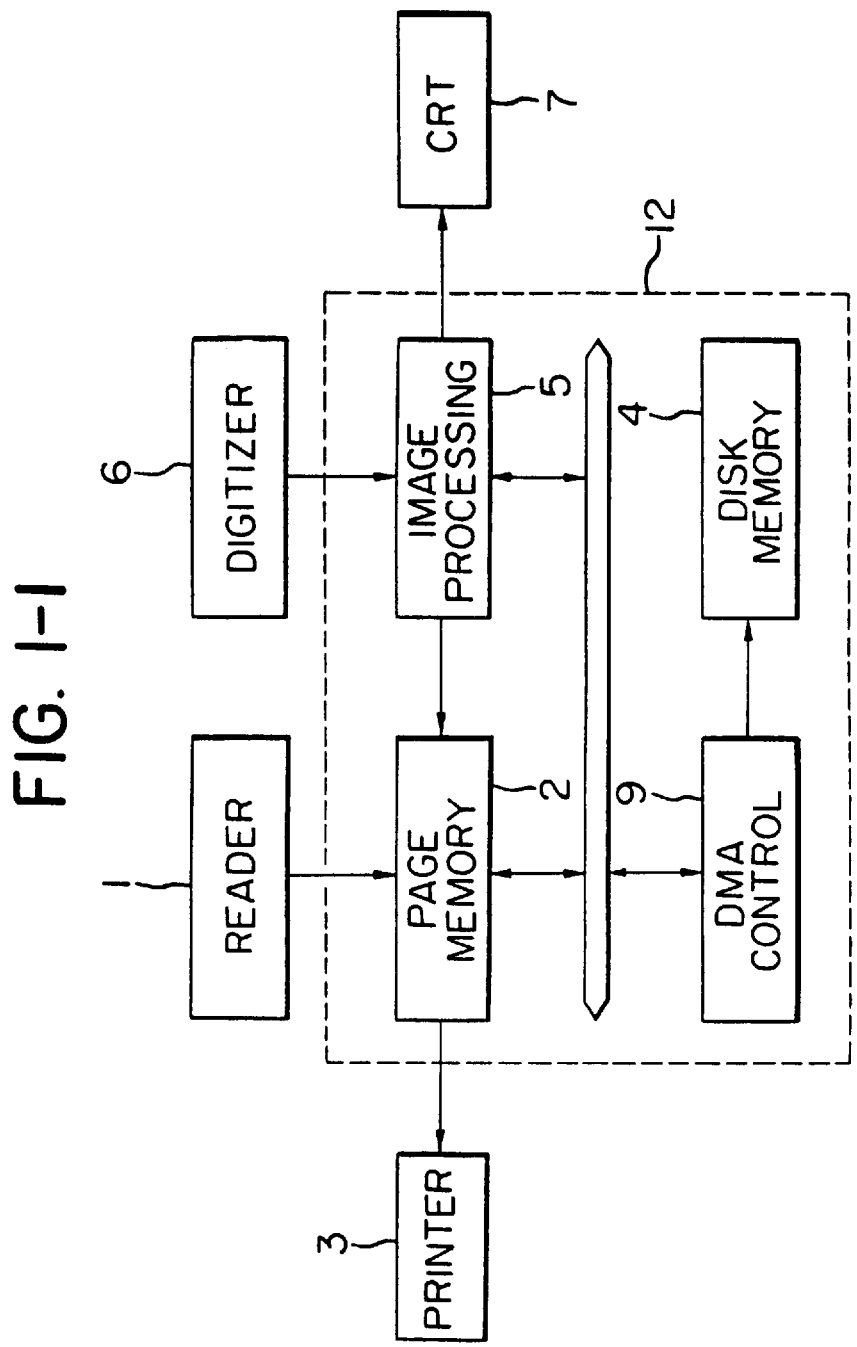

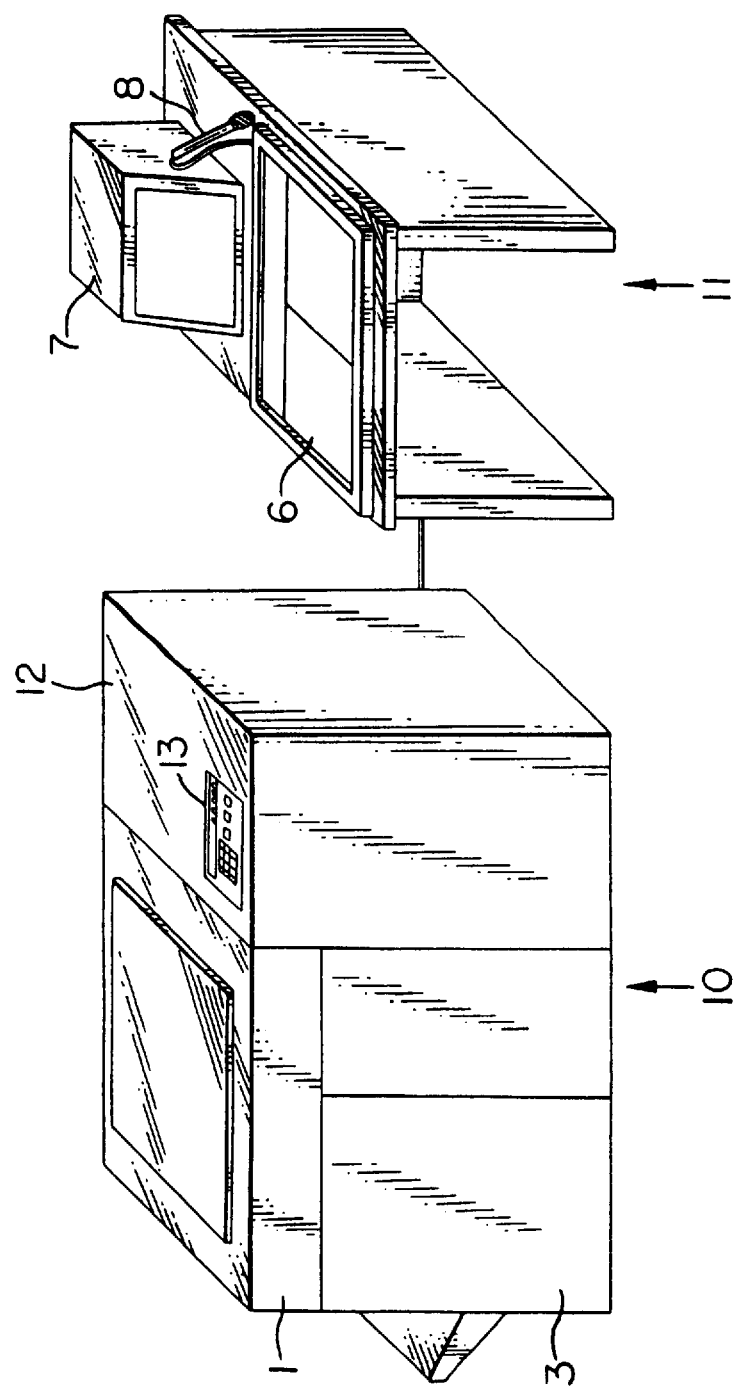

FIG. 3-2
15-1  15-2  15-3
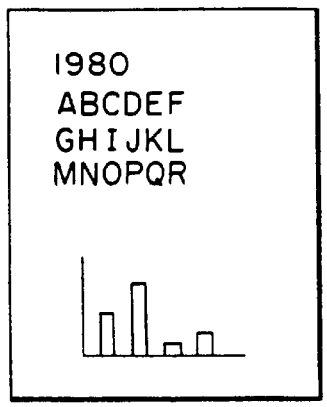 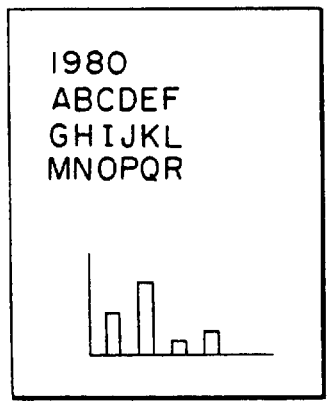 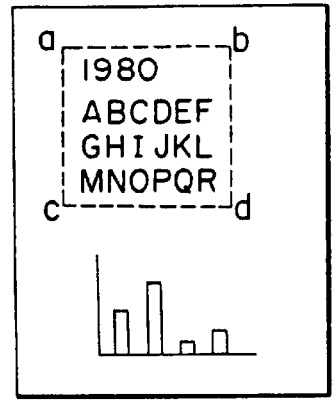
15-4
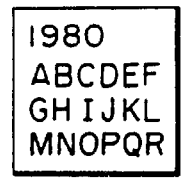
15-5  15-6  15-7
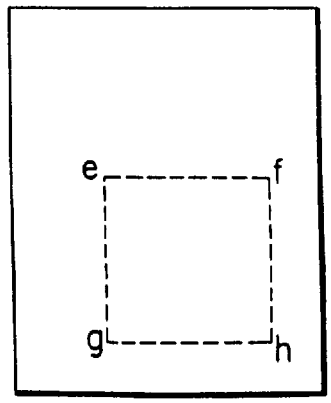 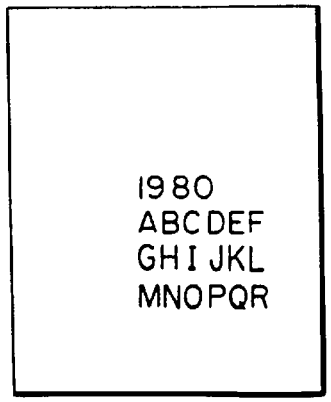 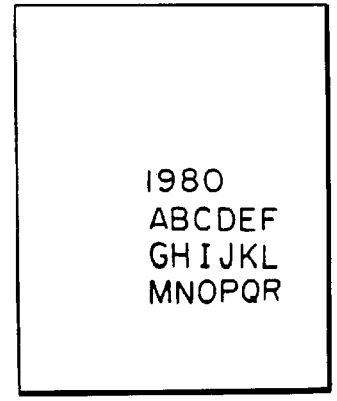

FIG. 3-3
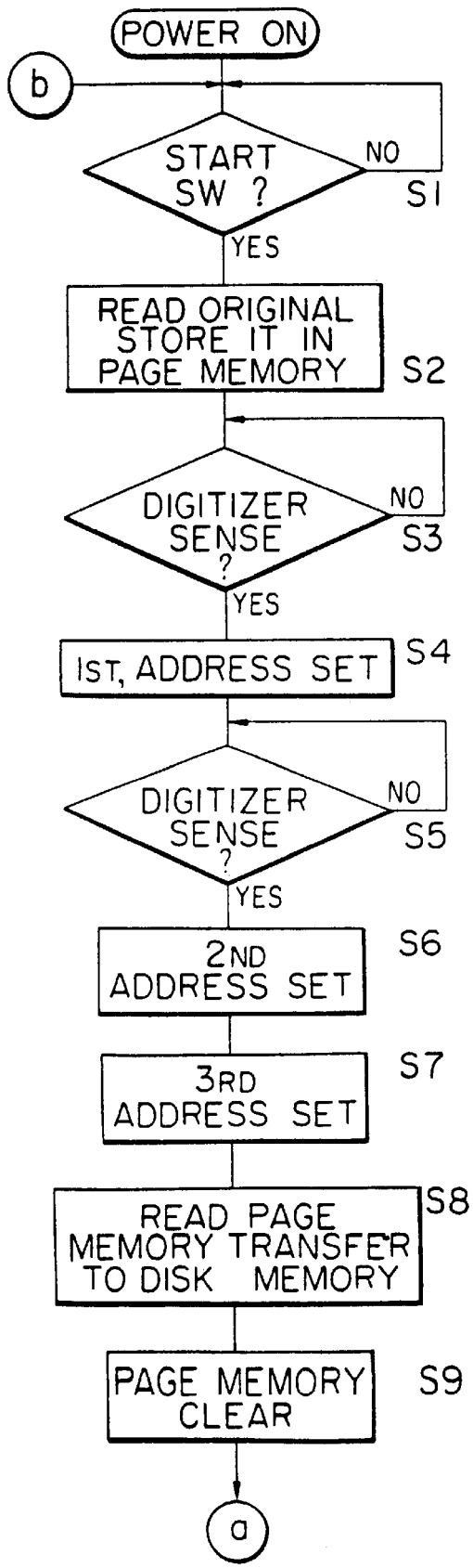
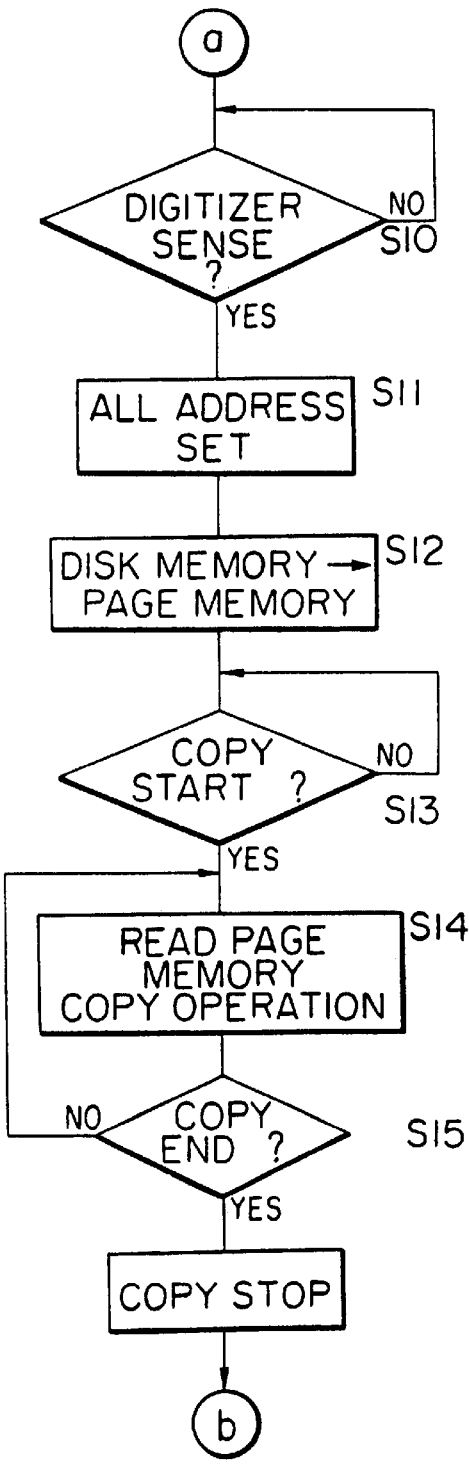

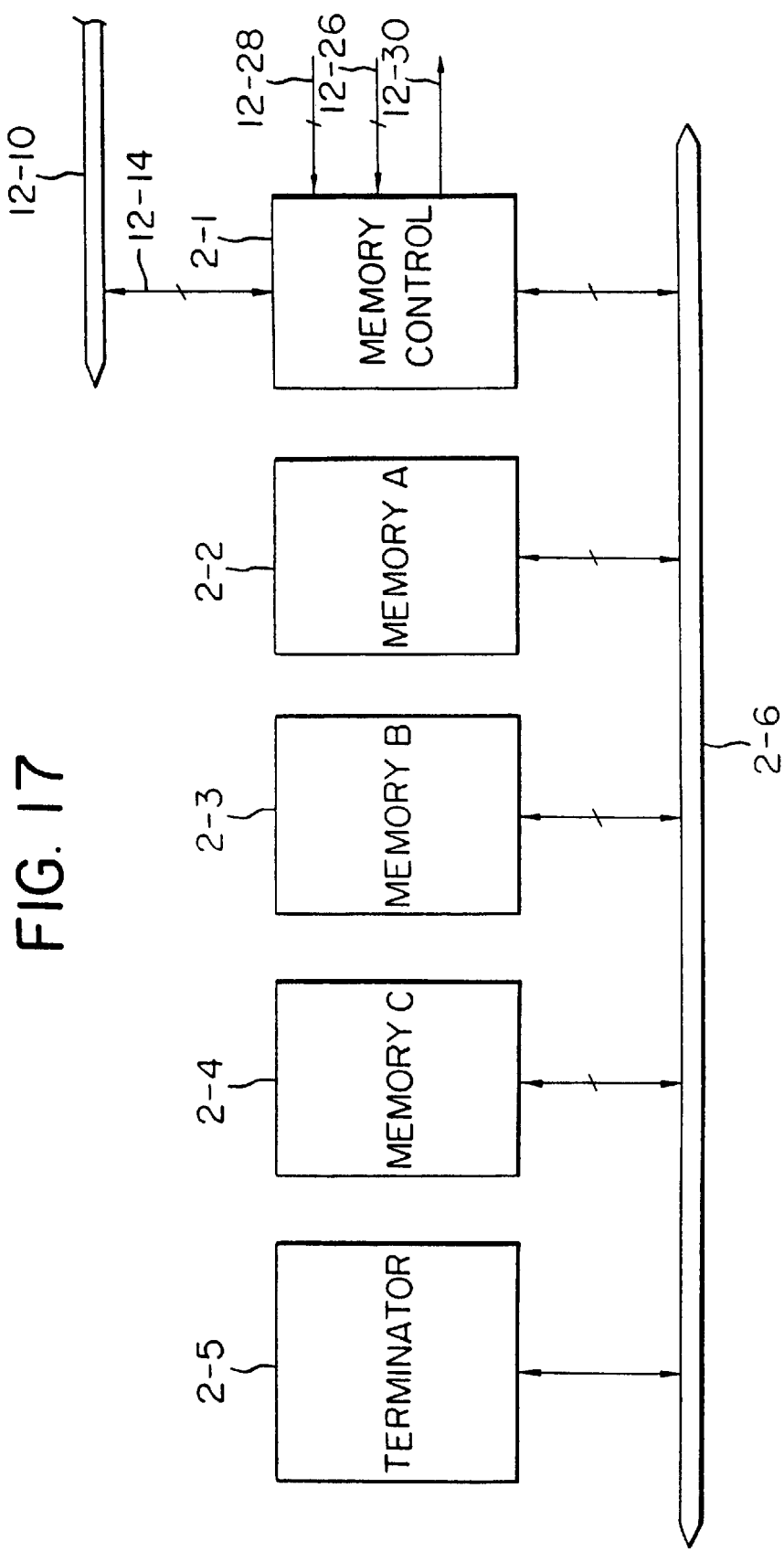

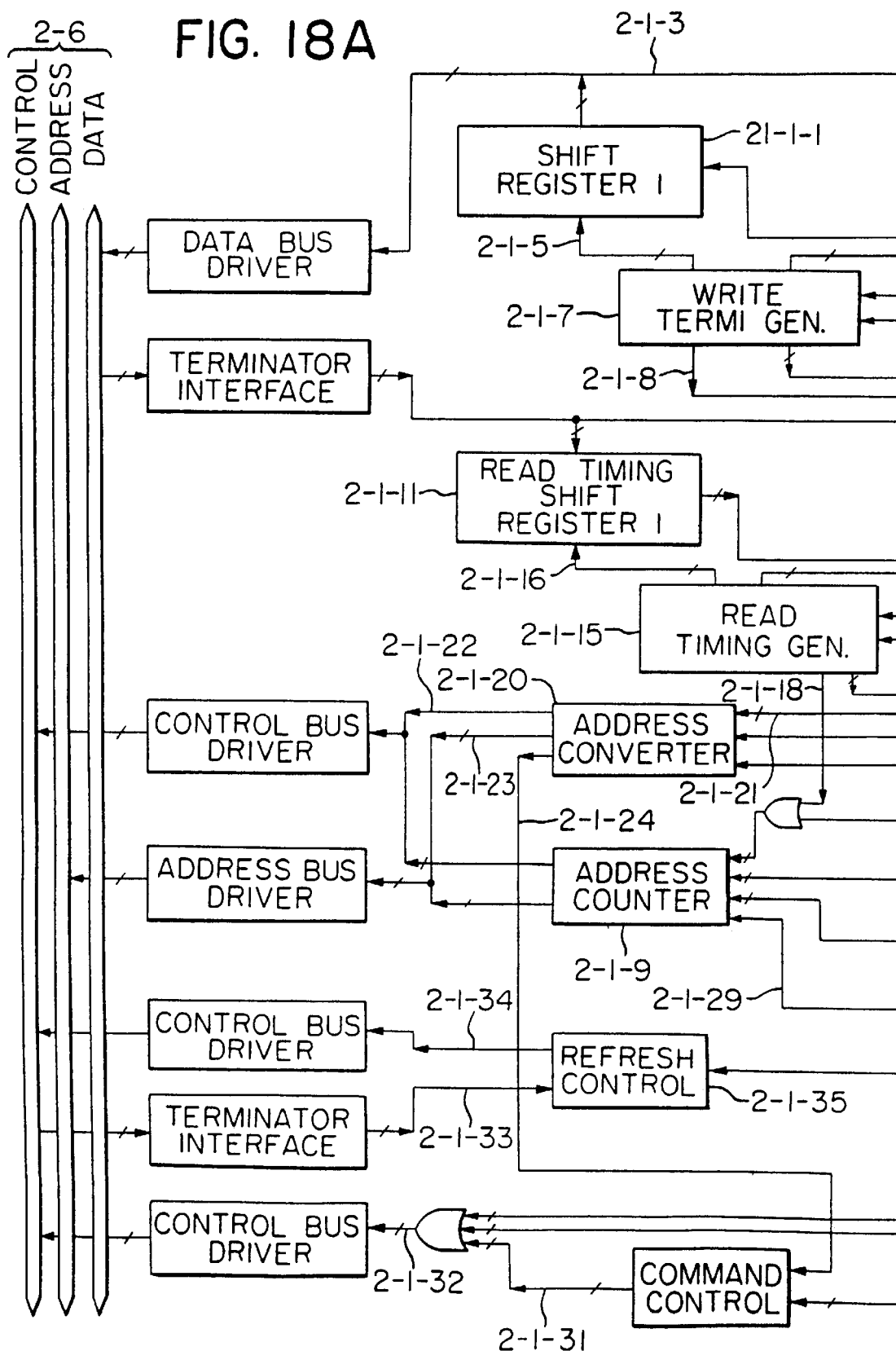

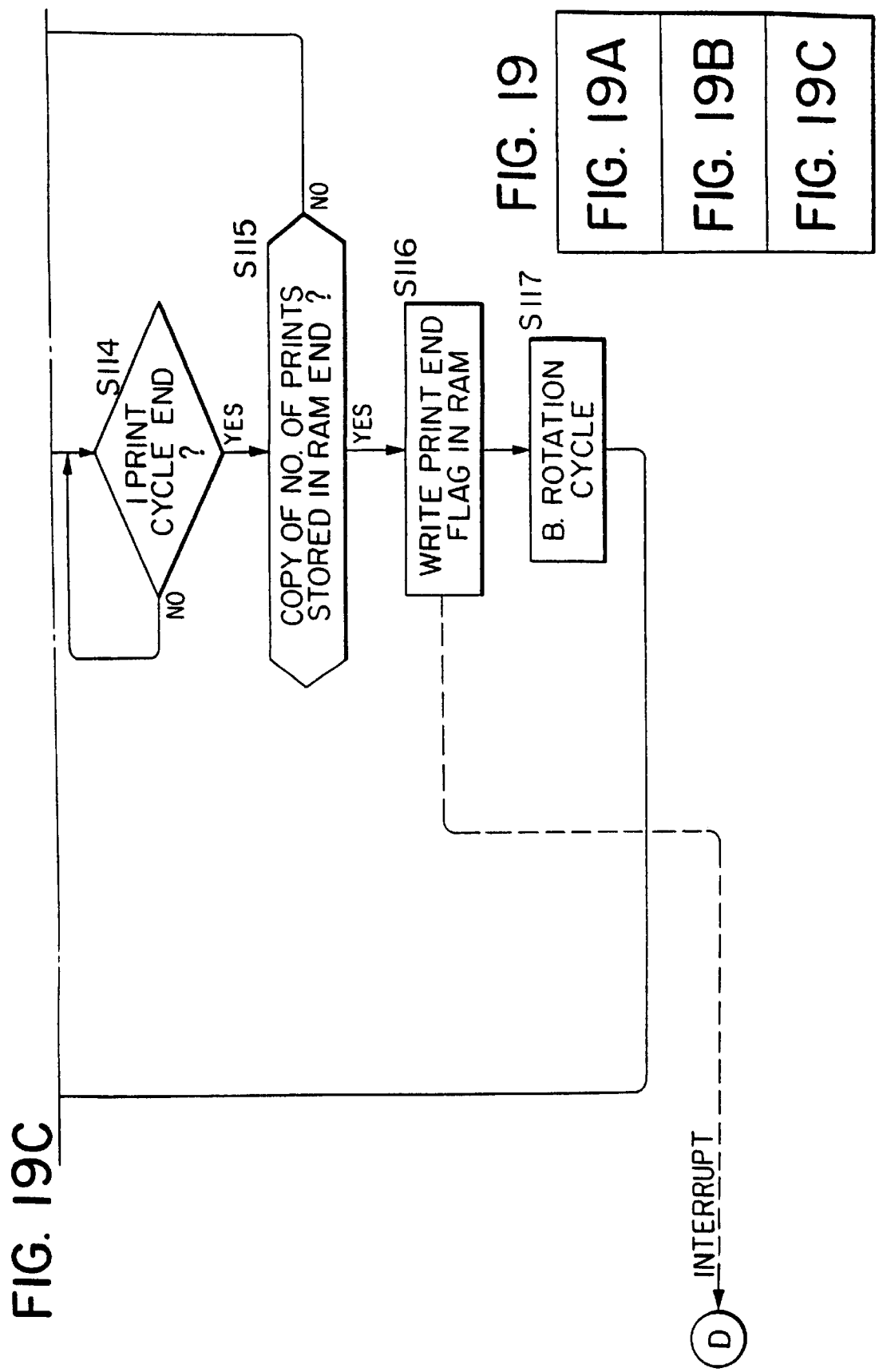

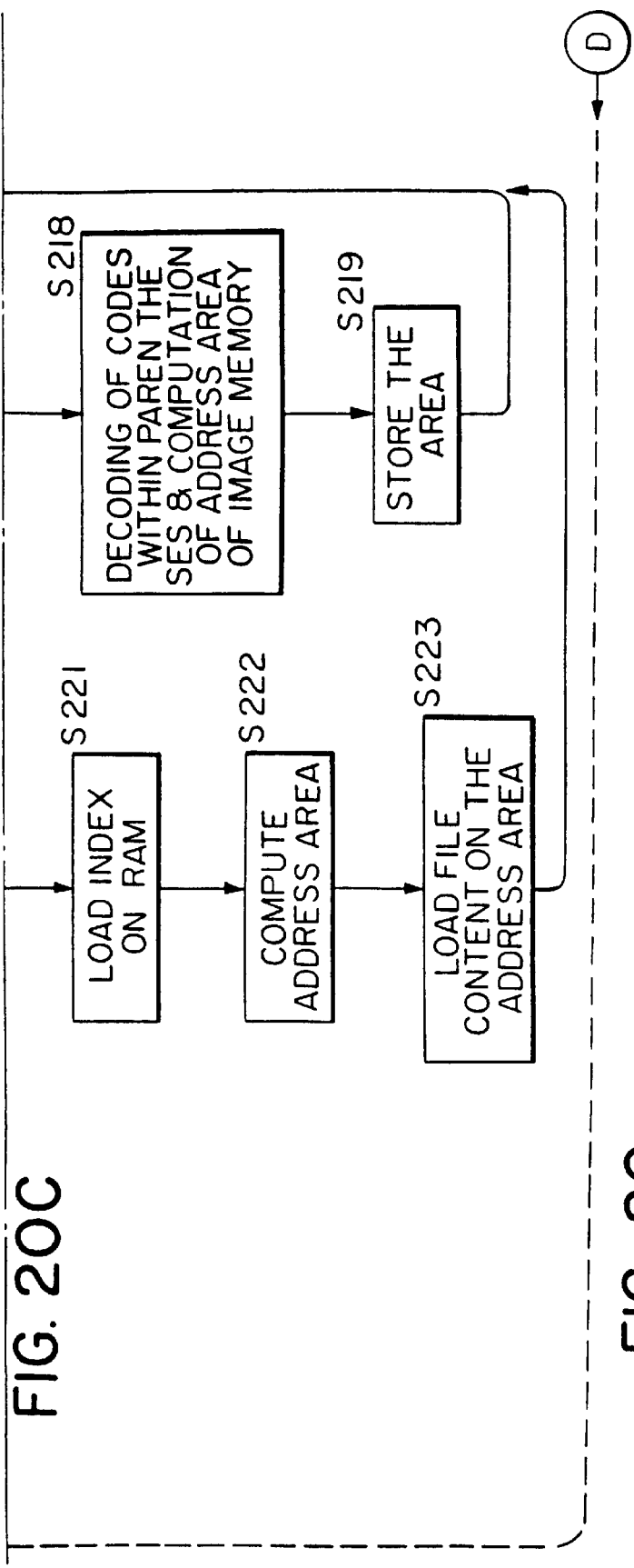

IMAGE PROCESSING SYSTEM

This application is a continuation of application Ser. No. 08/027,591, filed Mar. 5, 1993, now abandoned, which was a continuation of application Ser. No. 07/668,145, filed Mar. 11, 1991, now abandoned, which was a continuation of application Ser. No. 07/401,482, filed Aug. 30, 1989, now U.S. Pat. No. 5,008,760 which was a continuation of application Ser. No. 06/884,677, filed Jul. 17, 1986, now abandoned, which was a continuation of application Ser. No. 06/647,414, filed Sep. 5, 1984, now abandoned, which was a continuation of application Ser. No. 06/311,864, filed Oct. 15, 1981, now abandoned.

BACKGROUND OF THE INVENTION

1. Field of the Invention

The present invention relates to an image processing system for processing image information as electric signals.

2. Description of the Prior Art

A photocopying machine for duplicating images of an original is widely used as a processing system of image information. The system of this type adopts a general electrophotography device wherein an original is exposed to light emitted by a light source, such as a fluorescent light, the light reflected by the original is guided to a photosensitive body to form an electrostatic latent image thereon, and the electrostatic latent image is visualized according to a known developing means. However, when duplicating only part of an original with a conventional device, undesired portions of the original are masked or cut away for duplication of the desired portion, resulting in inconvenience.

Another type of image processing system has also been proposed wherein the image of an original is read out to generate corresponding electric signals which are processed electrically. With this type of system, in addition to the functions of the system of the former type, other kinds of image processing may be performed such as duplication of part of an original, synthesis of a plurality of images, or variation of the density of the image at only part of the original.

For example, it has been proposed to convert the image information of an original into electric signals by a solid image sensor such as a CCD and to electrically process the obtained electric signals, so that part of the original may be separated from the rest of the original. For this purpose, it is possible to limit the area for readout of the solid image sensor or to store the readout image information in a memory and to read out only the required information from the memory. When a memory is used, once the image information of the original is stored in the memory, the image information may be used for separation of desired parts, and the efficiency in office work may thus be improved. However, input of the address for outputting the image information stored in the memory is performed by supplying from a keyboard numerical data representing the addresses or by specifying the desired portion of the original displayed on a CRT using a light pen. Numeral setting for input from the keyboard requires a large quantity of address data.

In addition to this, the system of this kind becomes complex in structure, and the operation becomes difficult with an increase in the number of functions incorporated therein. This type of system may thus be operated only by those who are well acquainted with the operating procedure, and the image processing time may become very long, also resulting in inconvenience.

With a system in which image information is stored once in a memory means and the desired image information is accessed, various kinds of image processings may be performed. However, since the procedure involves storing of the image information in a memory means, the readout time of the image information from the memory means affects the processing time, and counters must also be incorporated for specifying the addresses in the memory means. DMA transfer is utilized for the transfer of the image information. When DMA transfer is utilized, high-speed reading of the image information into and out of the memory means may be achieved. However, since the addresses in the memory means are generally consecutive for each scanning operation, the initial address and the final address corresponding to the desired portion of the original must be specified corresponding to the number of subscanning operations of the image information. This number of specifying operations of addresses increases as the image element density is made higher.

SUMMARY OF THE INVENTION

It is an object of the present invention to provide an image processing system which eliminates the drawbacks of the conventional image processing systems.

It is another object of the present invention to provide an image processing system which is capable of performing high-speed image processing with a simple procedure.

It is still another object of the present invention to provide an image processing system which, when storing electric signal representing image information in a memory, is capable of specifying addresses in a memory with efficiency and of performing the image processing.

It is still another object of the present invention to provide a photocopying machine which is capable of rearranging different parts of an original and duplicating the rearranged pattern.

It is still another object of the present invention to provide an image processing system which is capable of reducing the number of addresses which are required to read out information from a memory means during the DMA transfer to improve the transfer speed.

BRIEF DESCRIPTION OF THE DRAWINGS

FIG. 1-1 is a block diagram showing the configuration of an image processing system according to an embodiment of the present invention;

FIG. 1-2 is a perspective view of the embodiment shown in FIG. 1-1;

FIG. 2 is a perspective view of a digitizer 6;

FIG. 3-1 is a view showing in detail a panel of the digitizer shown in FIG. 2;

FIG. 3-2 is view for explaining the method for specifying an area with the digitizer 6;

In FIG. 3-2, 15-1 is an original record, 15-2 is a stored image of the record, 15-3 illustrates position of a rectangle to surround the selected portion of the image, 15-4 illustrates the selected image information, 15-5 illustrates a rectangle, the same size as the image information into which the image information is moved, 15-6 illustrates the image information in a page memory, and 15-7 illustrates output of the image;

FIG. 3-3 is a flow chart for explaining control of the specifying procedure for the area;

In FIGS. 6, 6(a) shows original information $n_1$ stored in a page memory,

6(b) illustrates original information $n_2$ stored in a page memory, and

Figure 2:
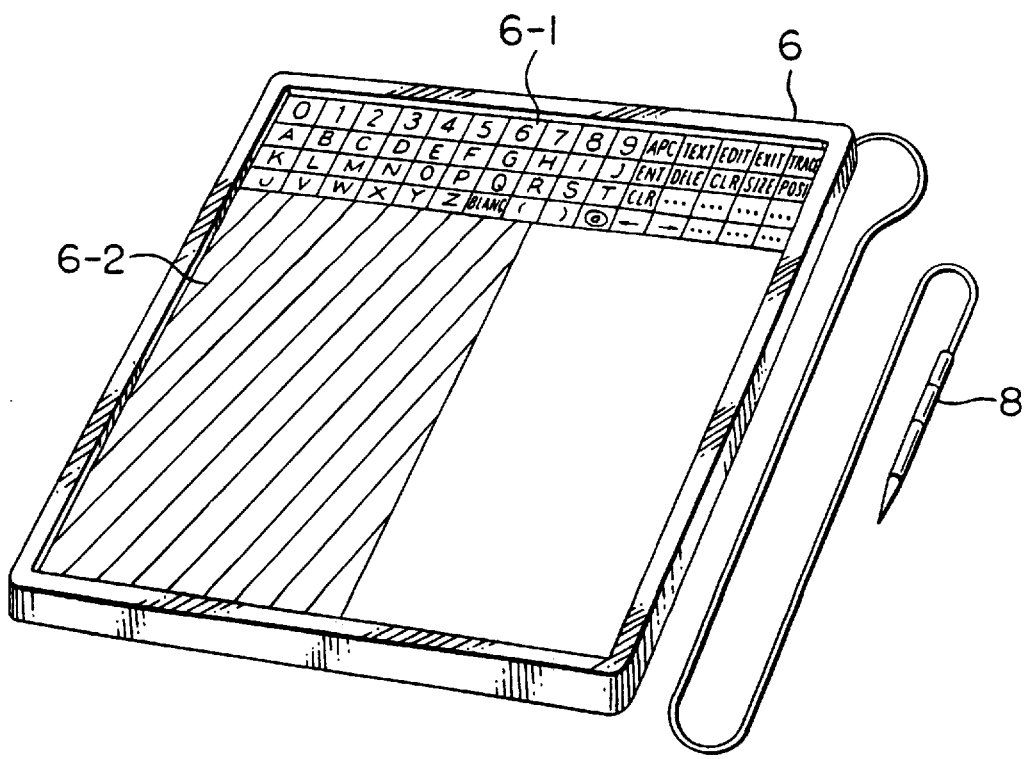
Figures 1, 3:
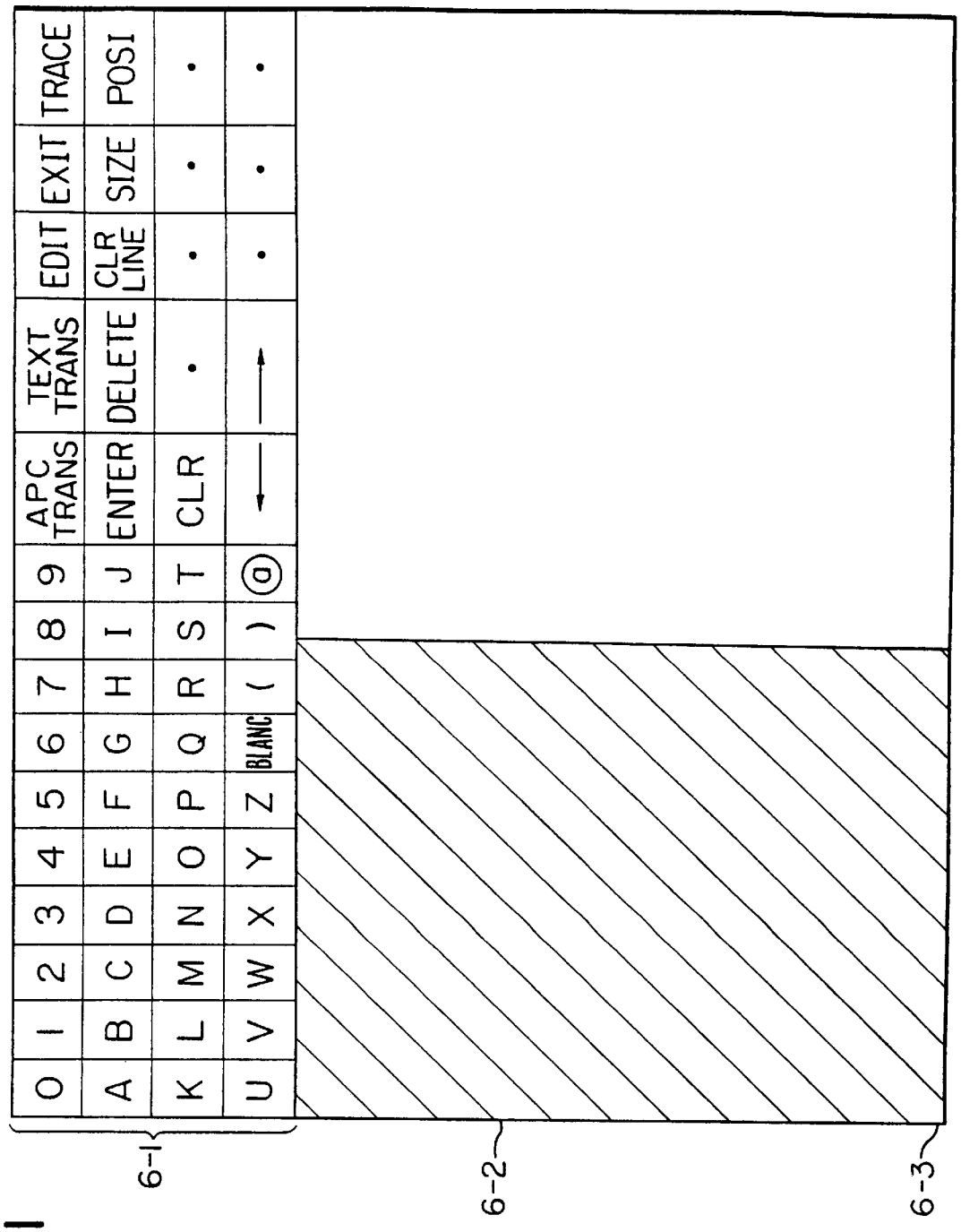
Figure 7:
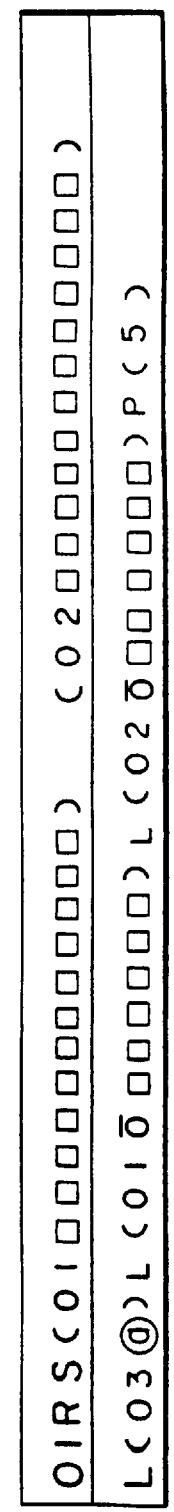
Figure 8:
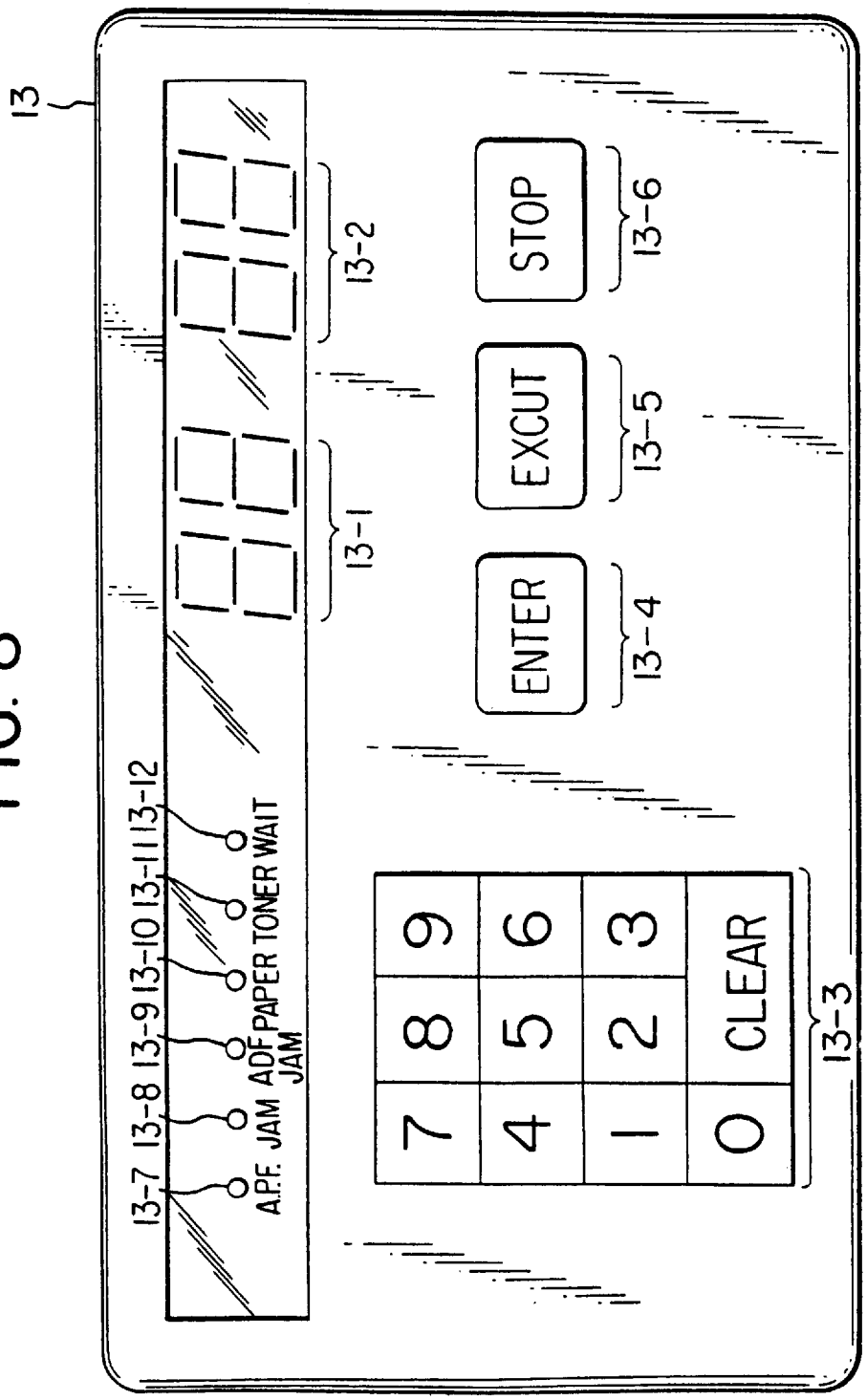
Figure 9C:
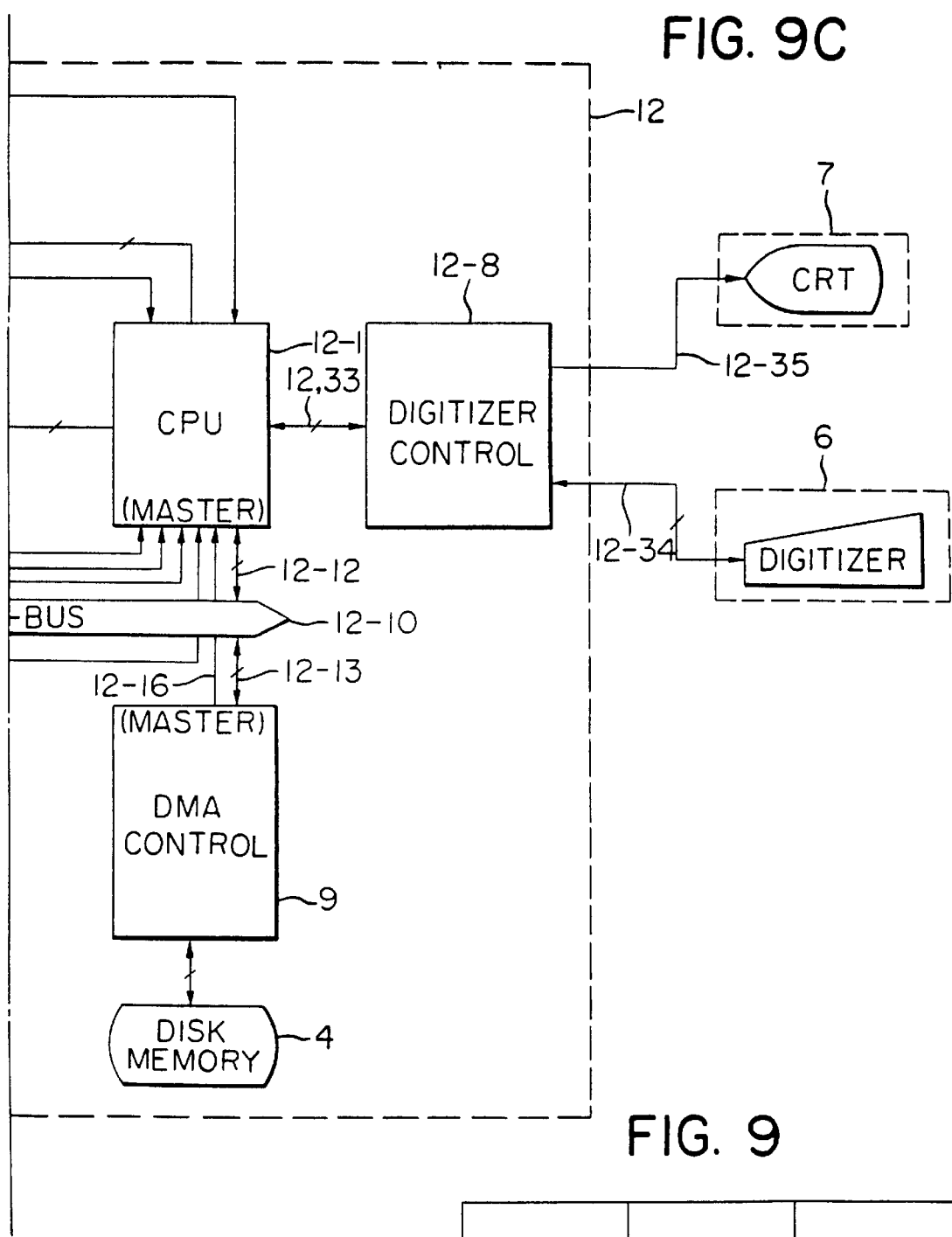
Figure 9:
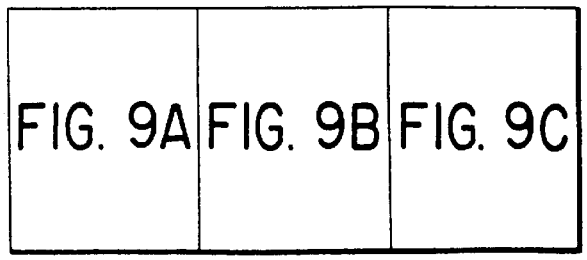
Figure 9A:
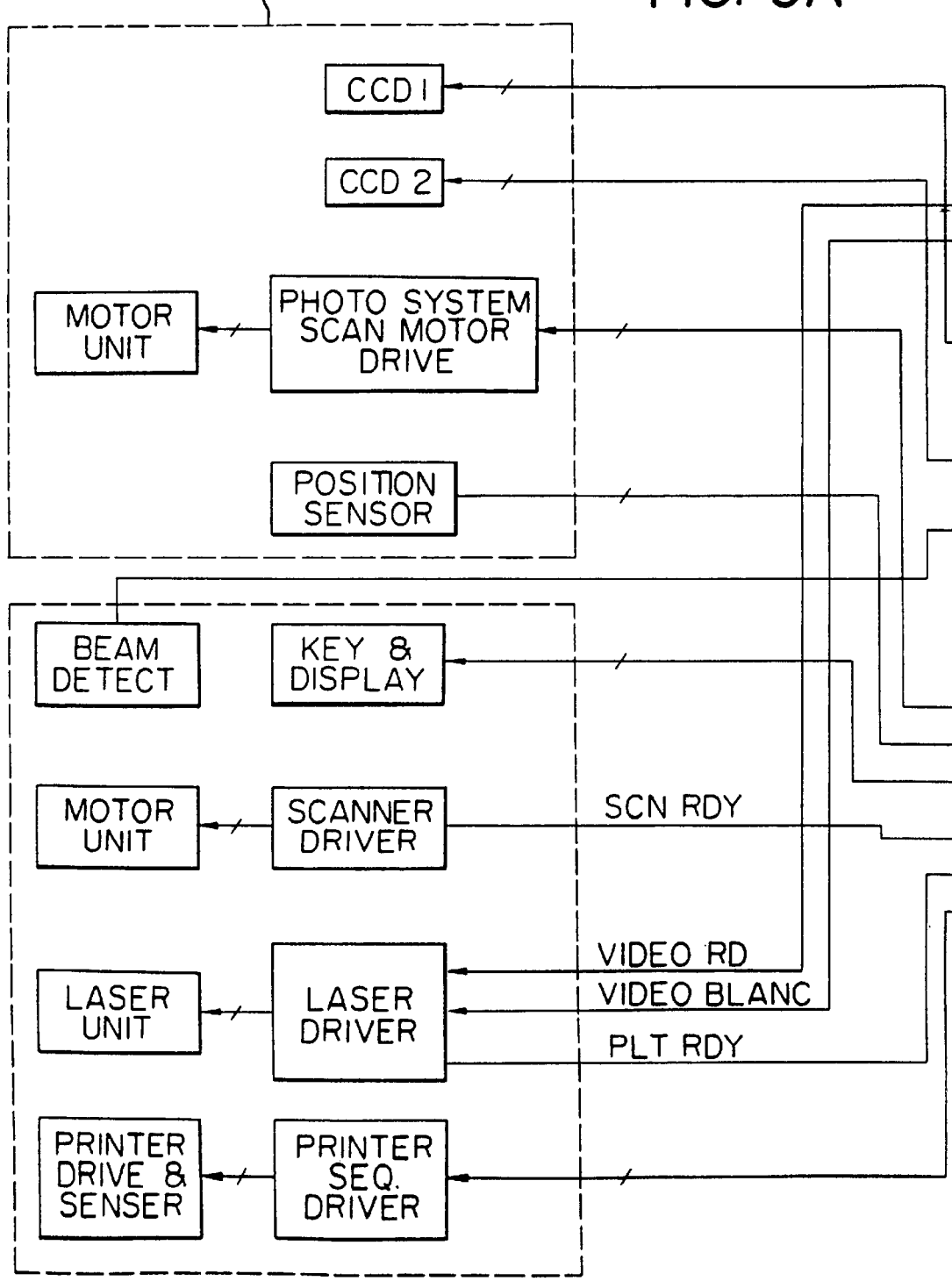
Figure 9B:
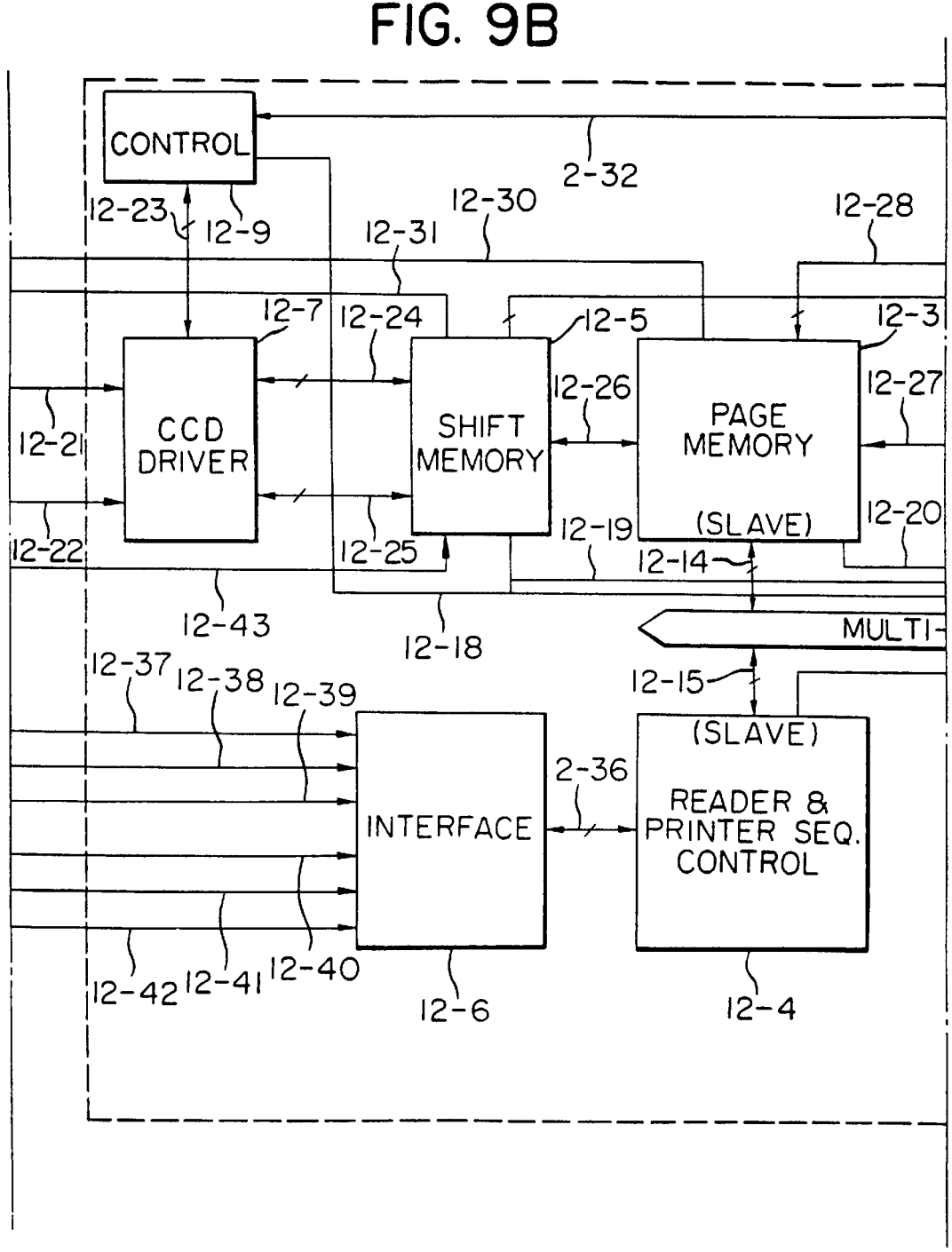
Figure 10:
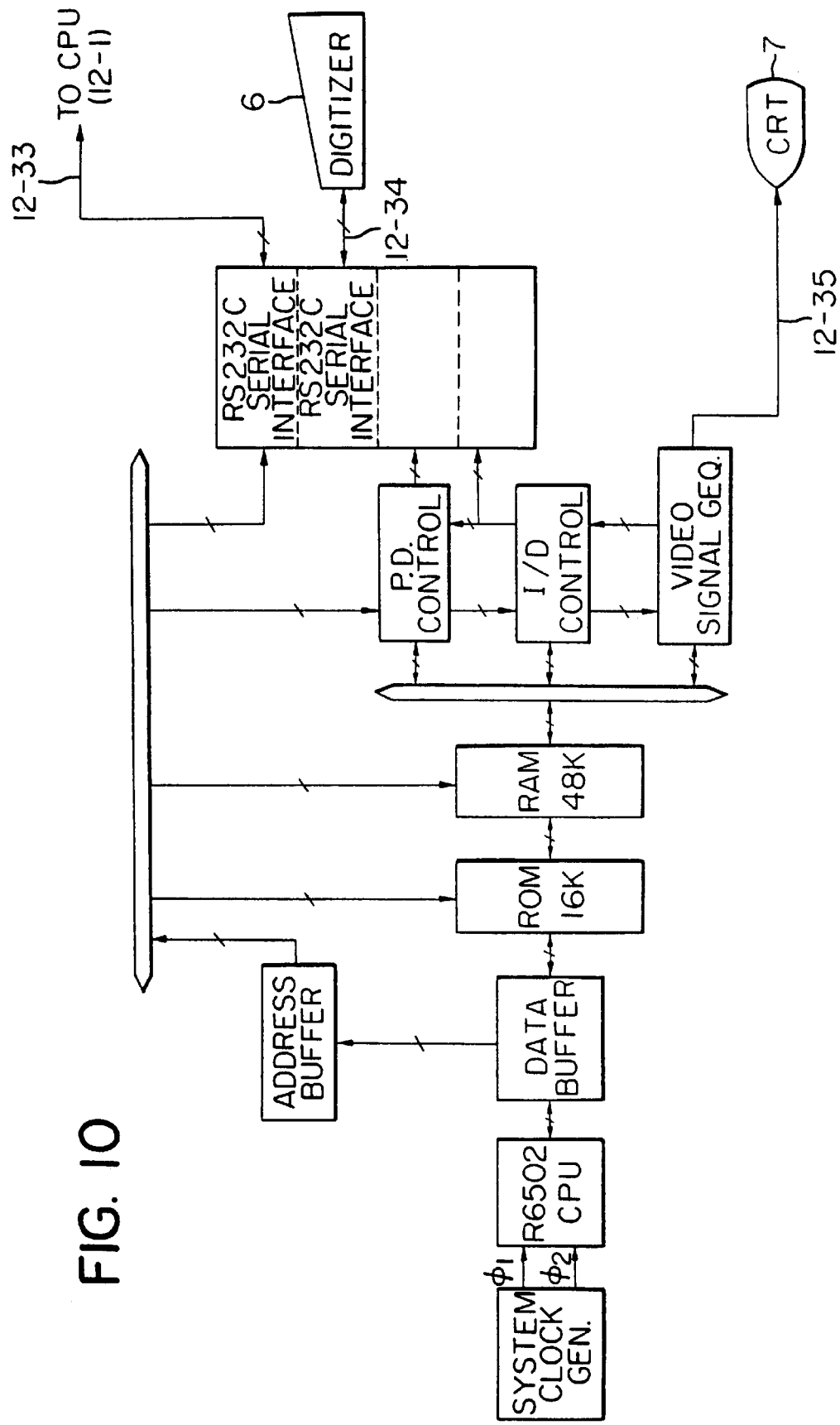
Figure 11:
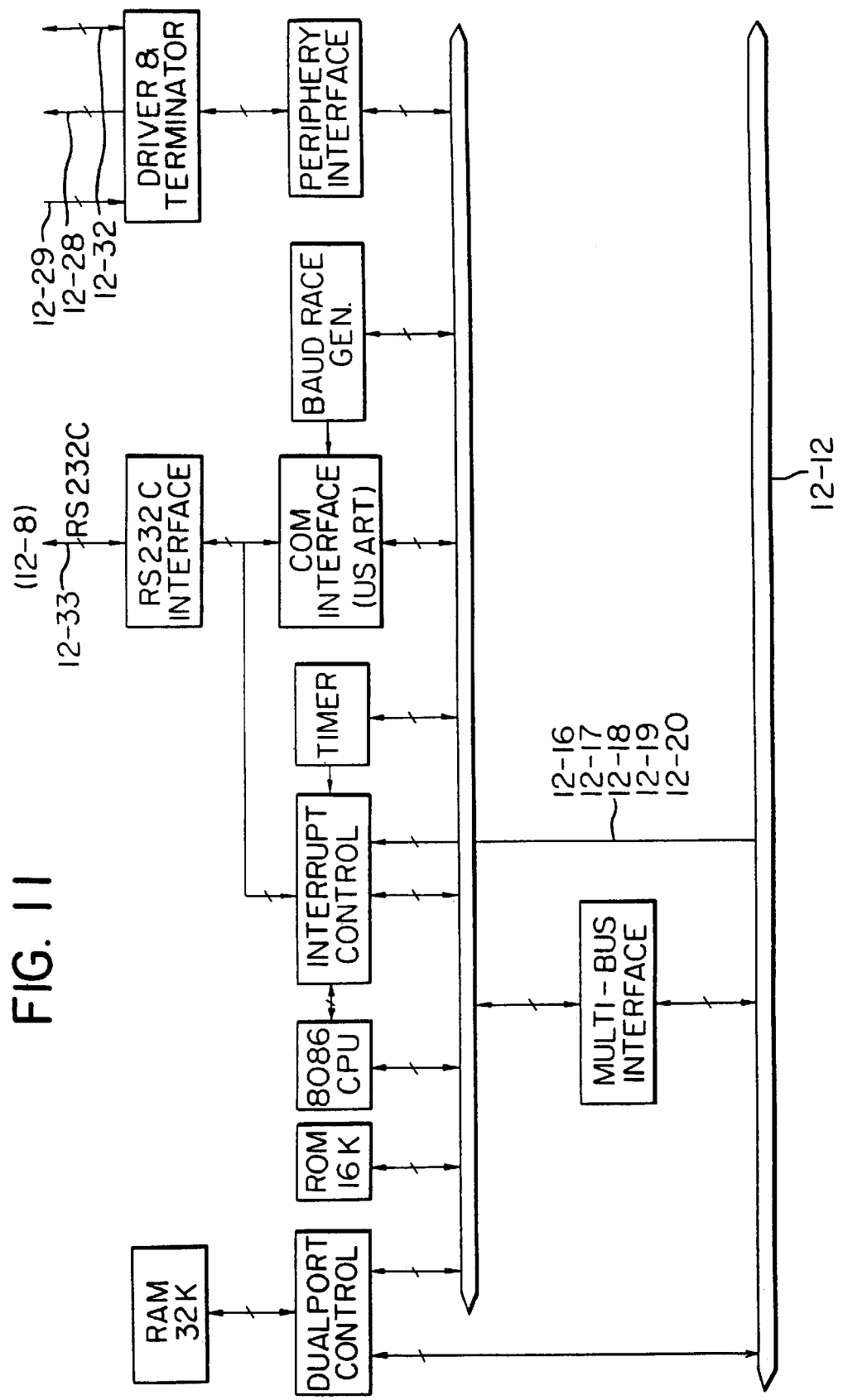
Figure 12:
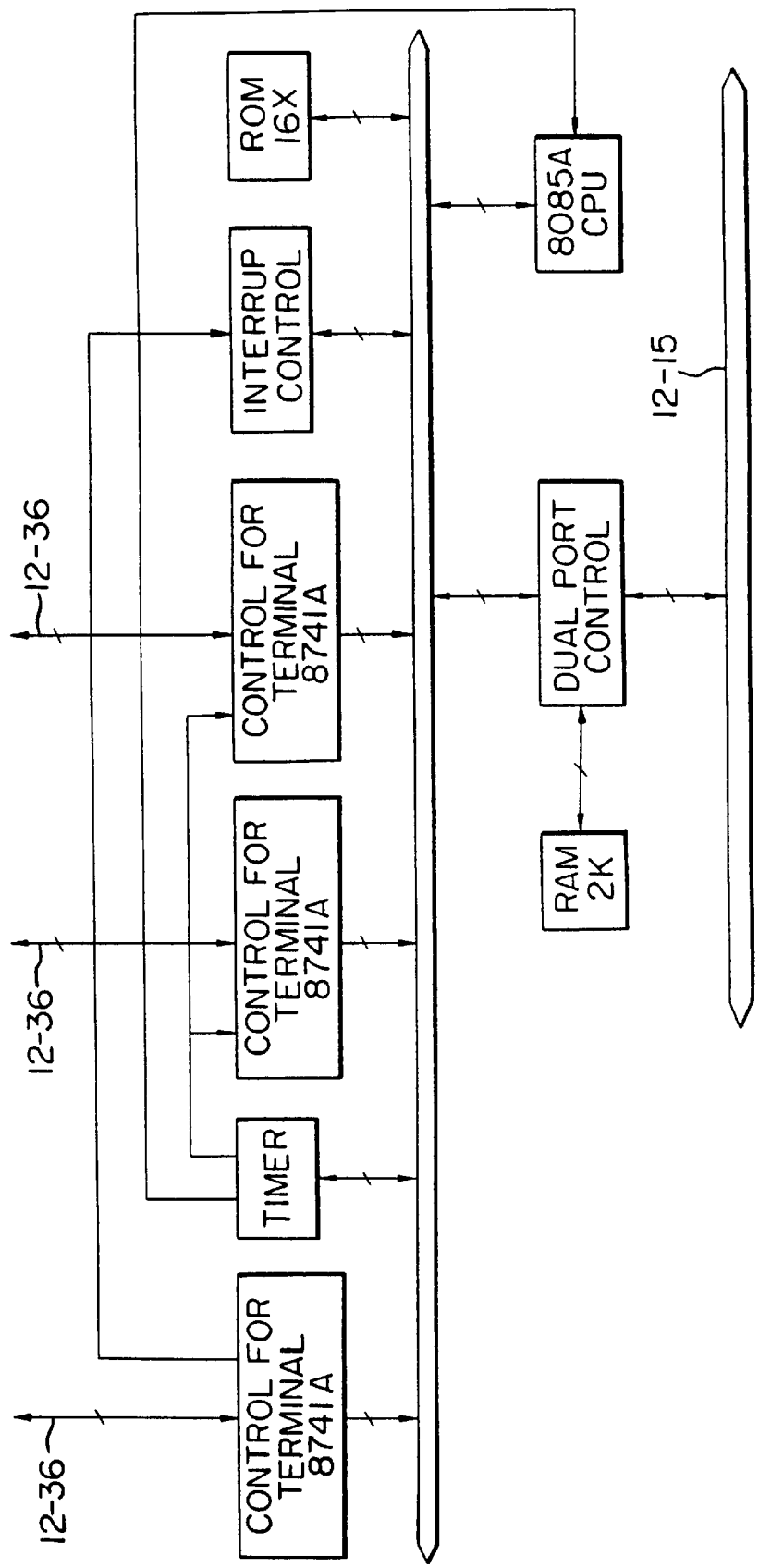
Figure 13:
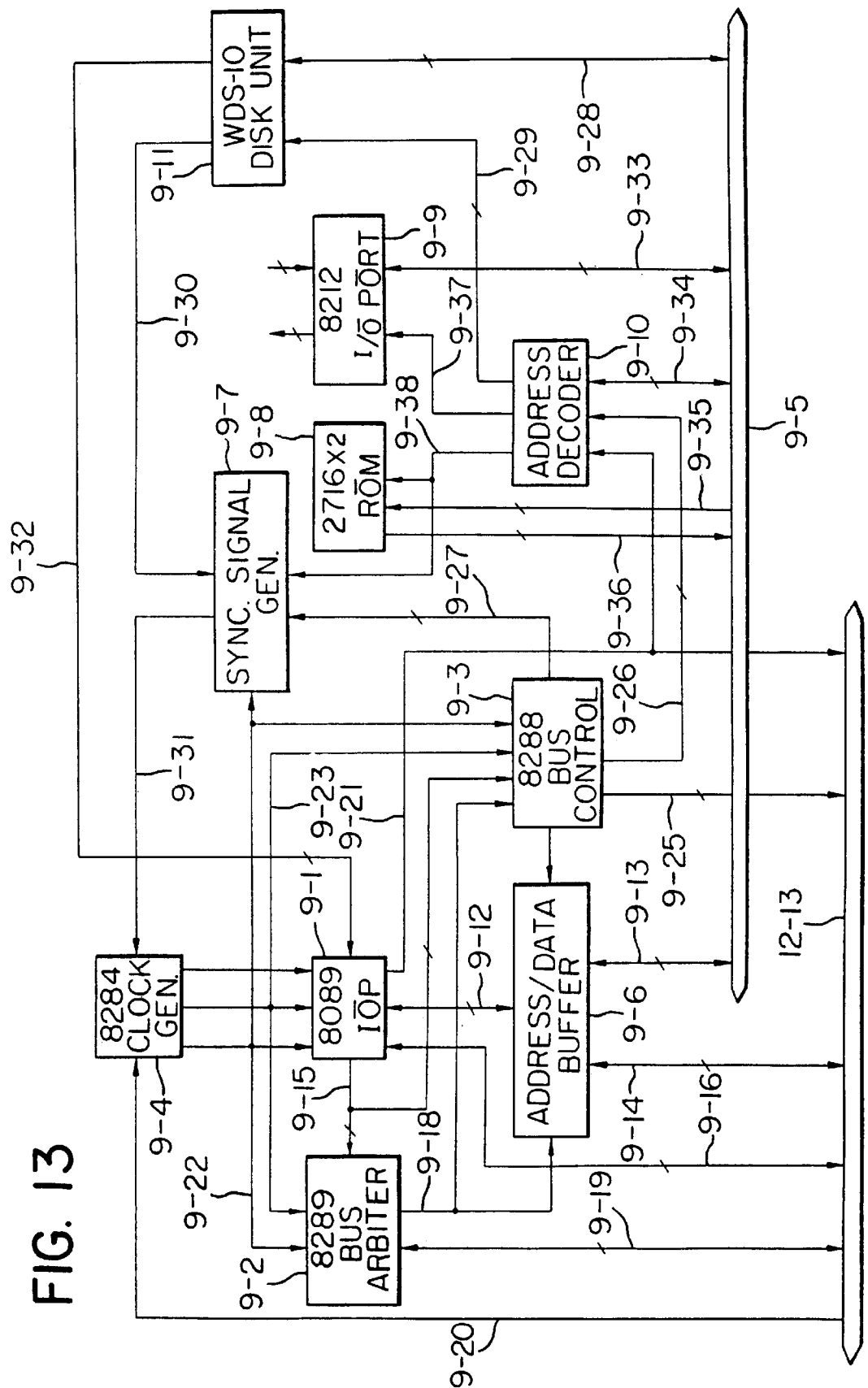
Figure 14:
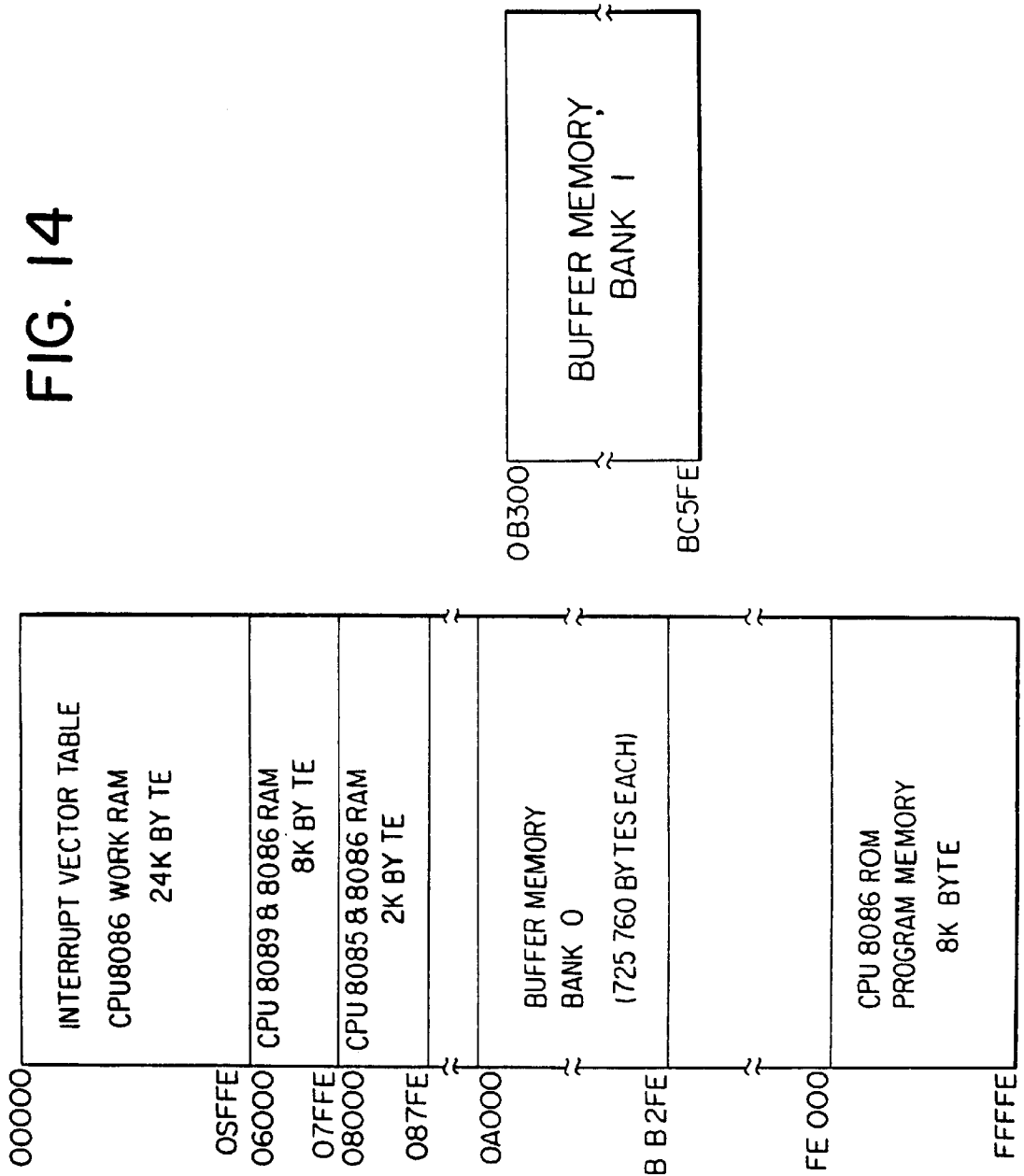
Figures 1, 15:
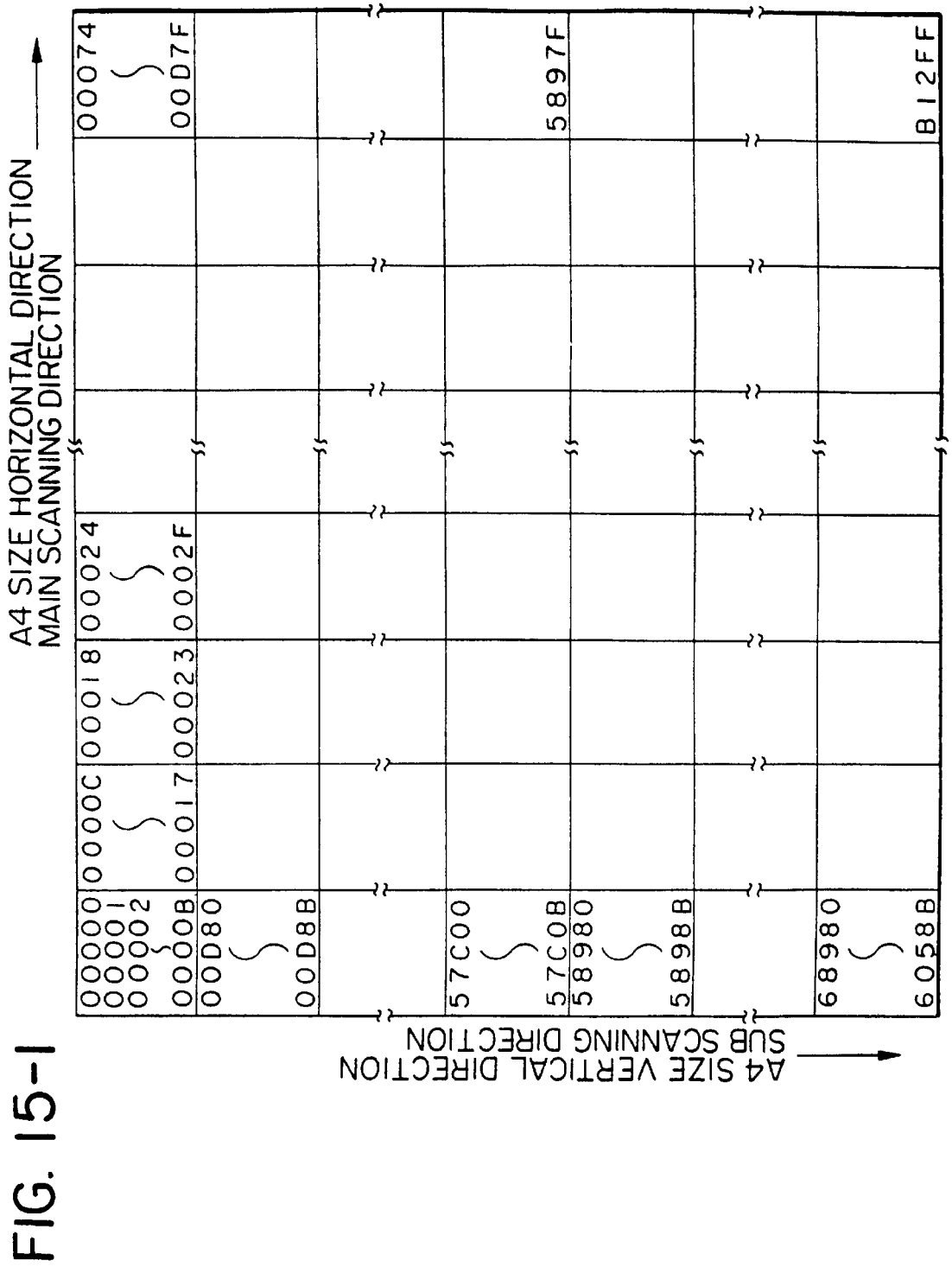
Figures 2, 15:
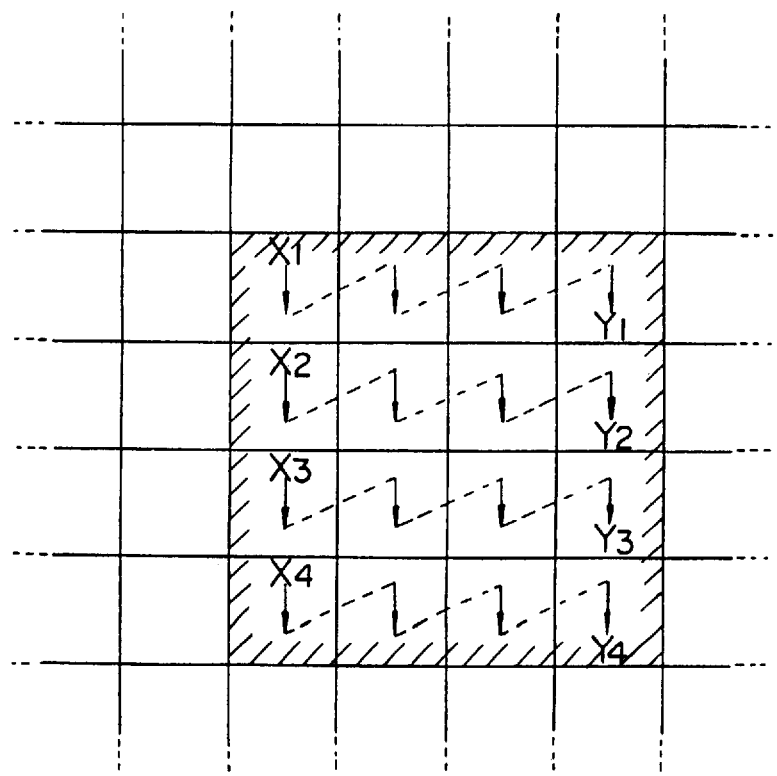
Figure 16:
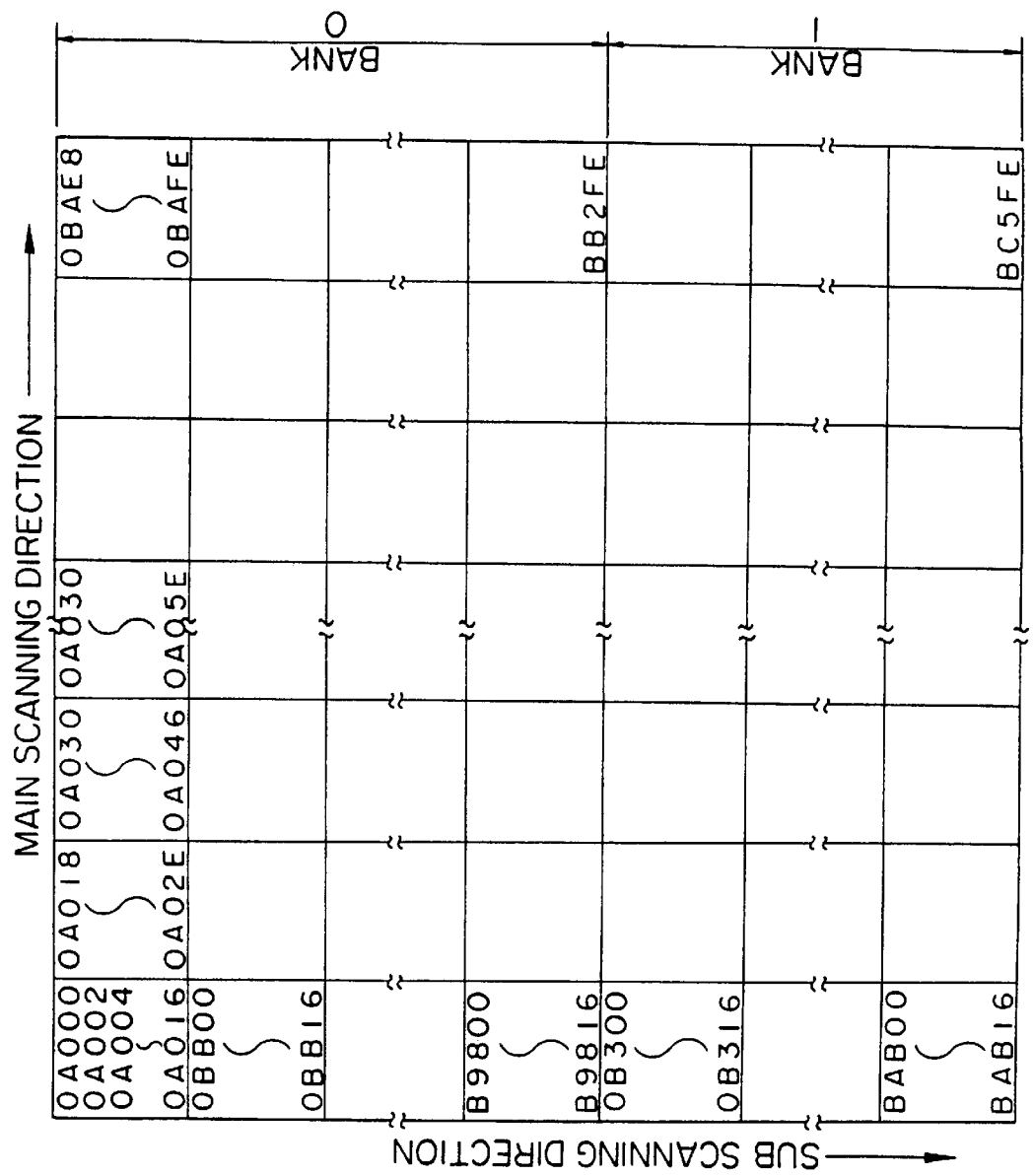
Figure 18C:
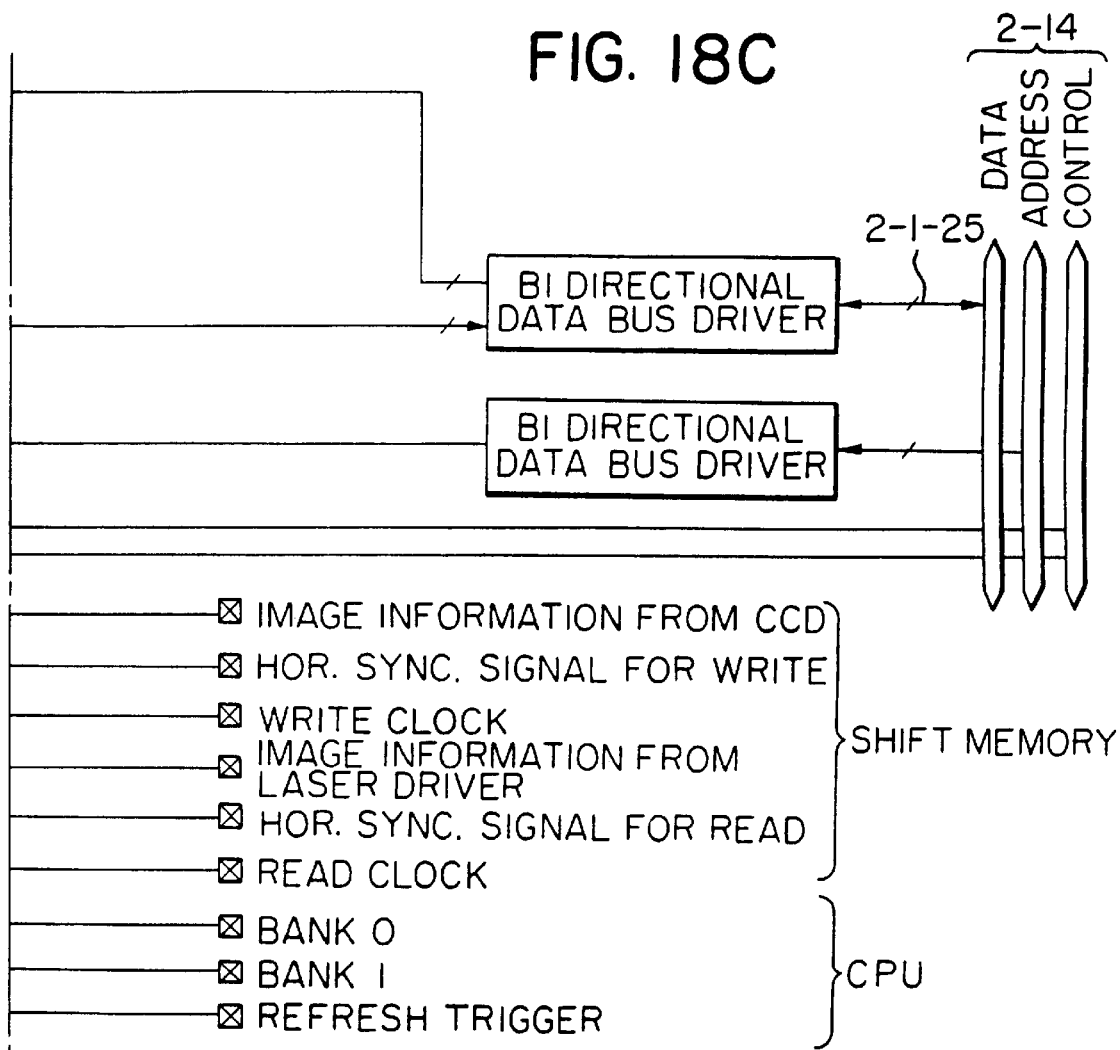
Figure 18:
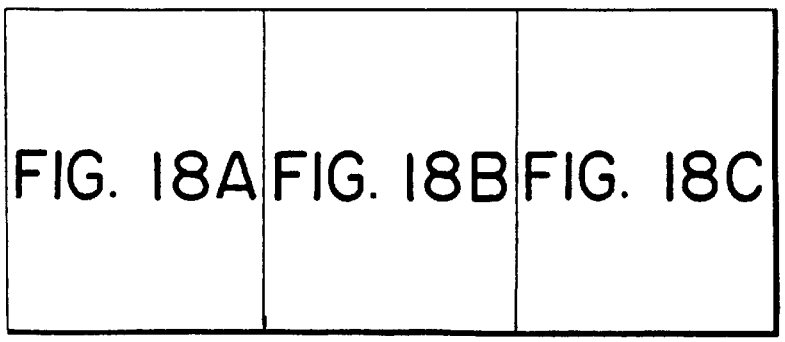
Figure 18B:
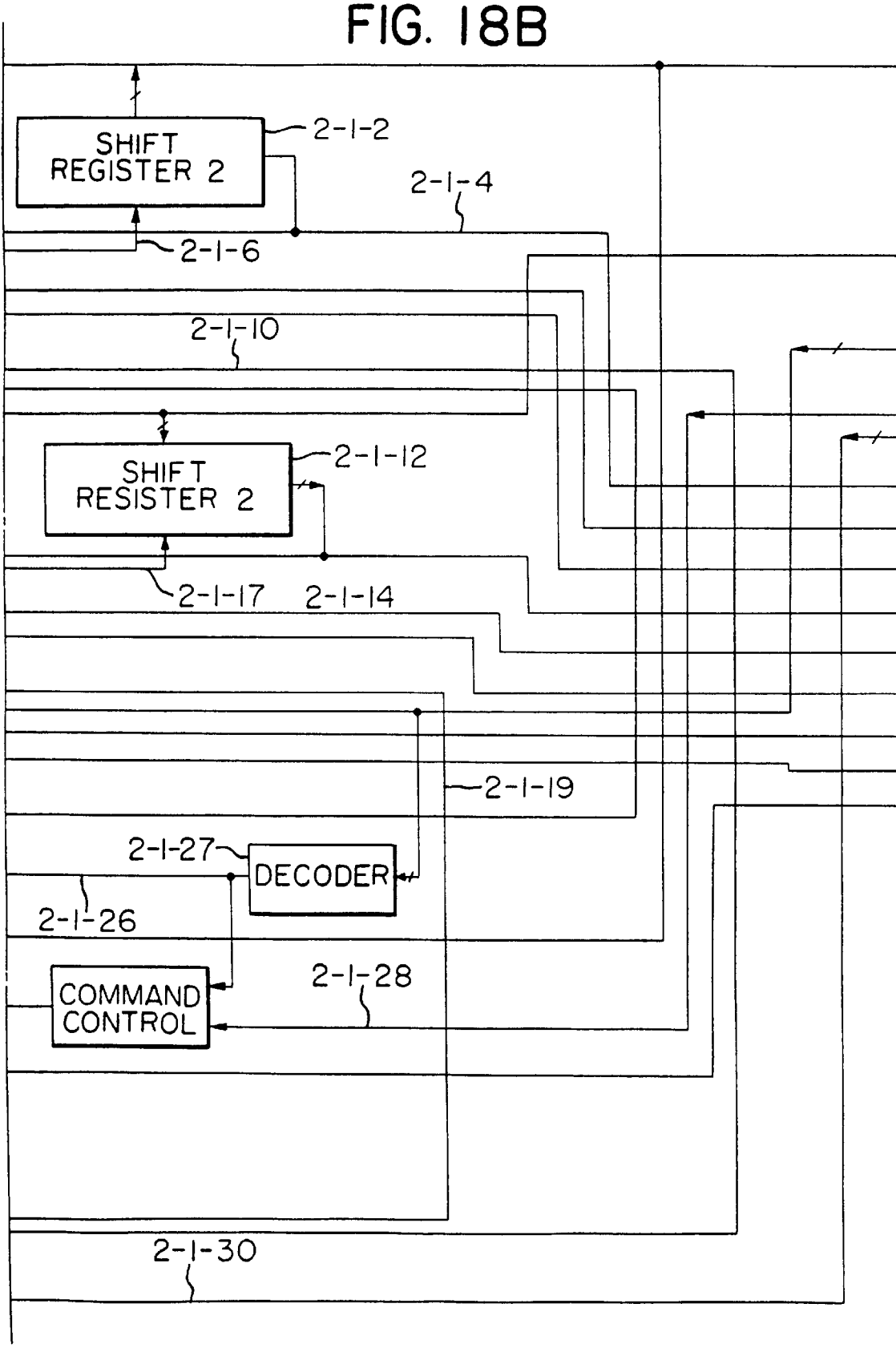
Figure 19A:
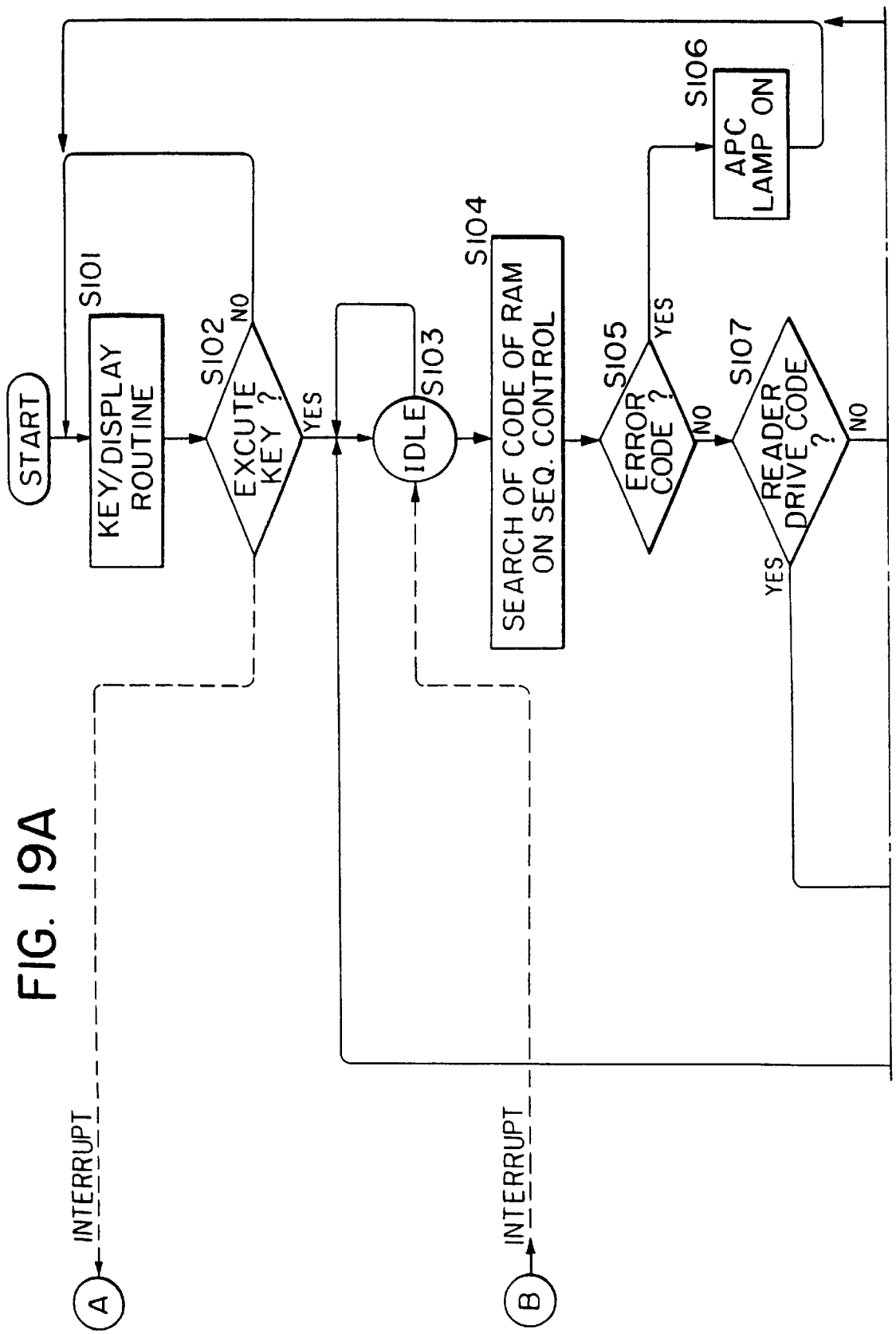
Figure 19B:
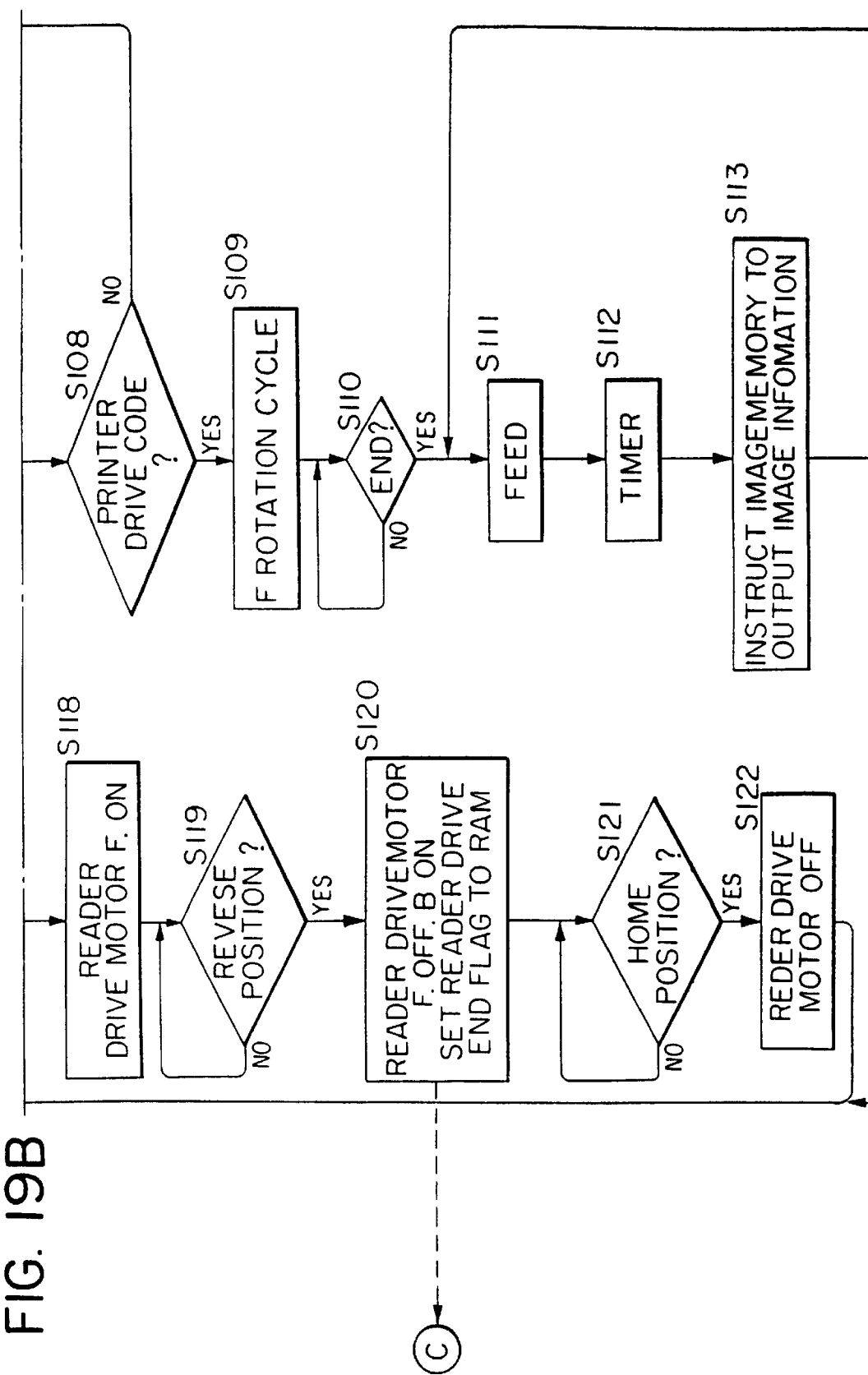
Figure 20A:
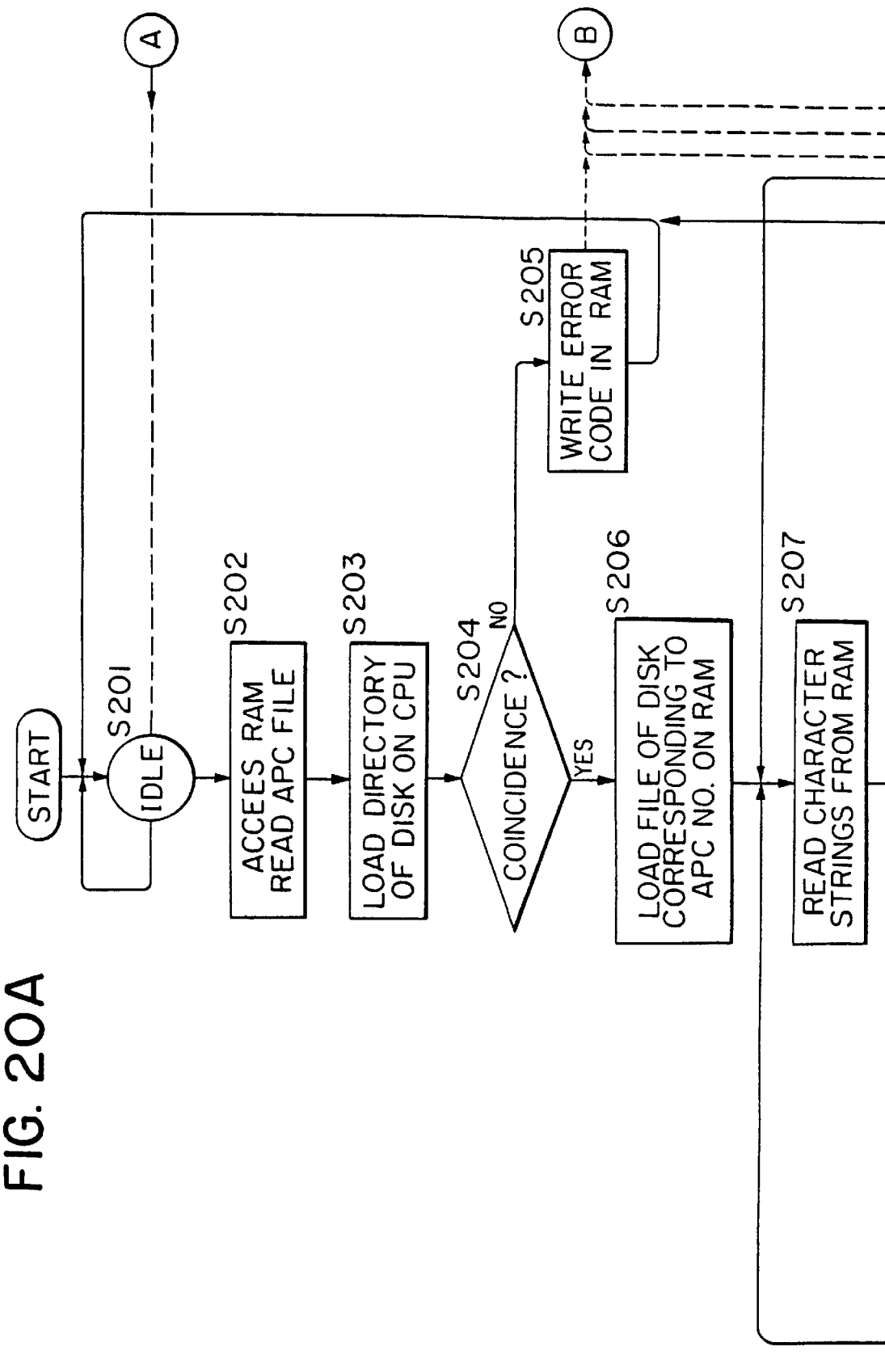
Figure 20B:
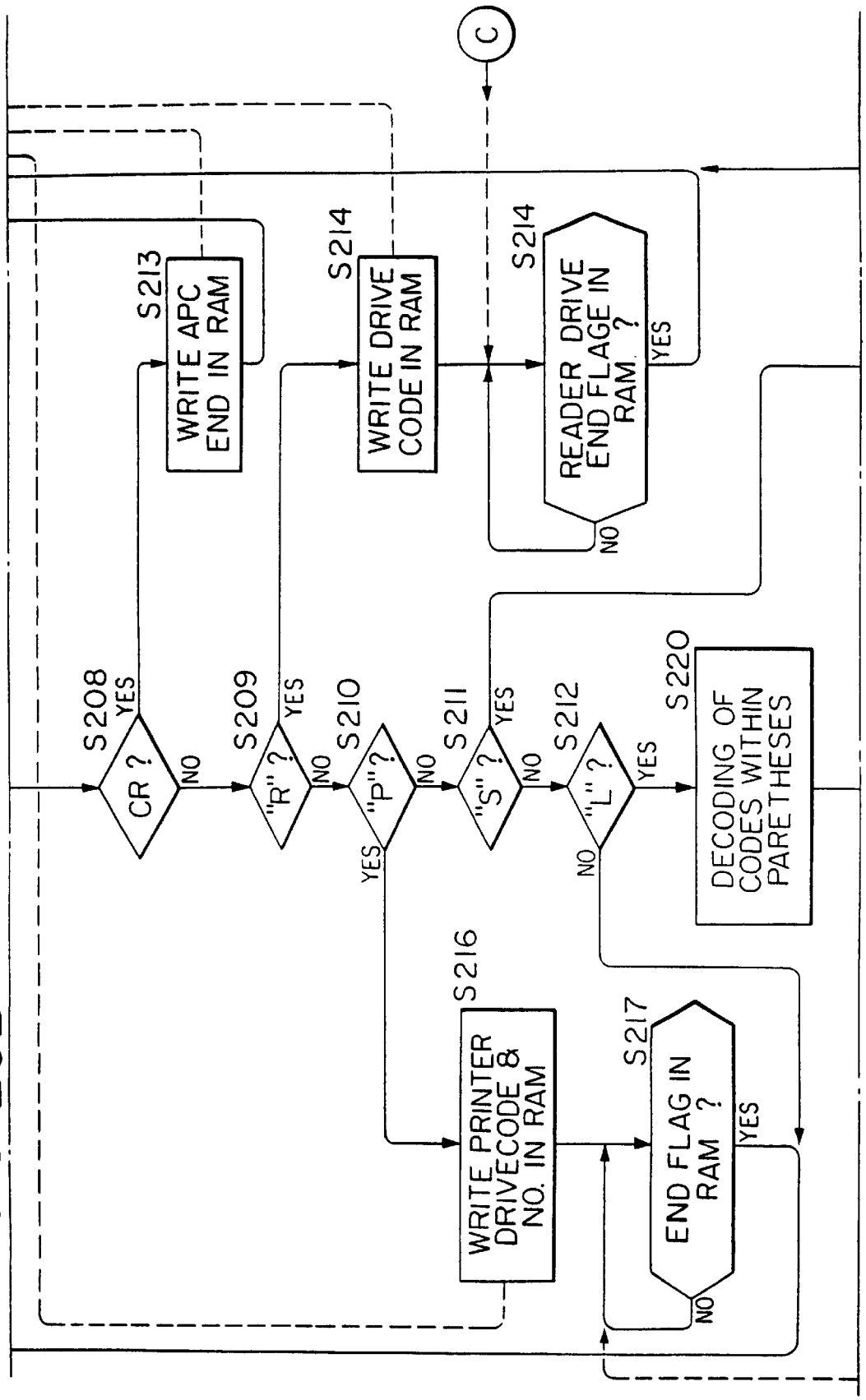

6(c) illustrates processed image information $n_1$ and $n_2$ stored in a page memory;

FIG. 7 is a view showing an application buffer;

FIG. 8 is a view showing a control panel 8;

FIG. 9 shows the relationship between FIGS. 9A, 9B, and 9C,

FIGS. 9A, 9B and 9C show a block diagram of the system shown in FIG. 1-1;

FIG. 10 is a block diagram showing the CRT and a digitizer controller 12-8;

FIG. 11 is a block diagram showing a CPU circuit block 12-1;

FIG. 12 is a block diagram showing a reader and printer sequence controller 12-4;

FIG. 13 is a block diagram showing a DMA controller 12-2;

FIG. 14 shows a memory map for a multibus;

FIG. 15-1 shows the address map of a page memory circuit block 12-3;

FIG. 15-2 shows part of the address map shown in FIG. 15-1;

FIG. 16 shows the address map of the page memory circuit block 12-3 for the multibus;

FIG. 17 is a block diagram of the page memory circuit block 12-3;

FIG. 18 shows the relationship between FIGS. 18A, 18B, and 18C,

FIGS. 18A, 18B and 18C show, in combination, a block diagram of a memory controller 12-3-1; and FIG. 19 and 20 show the relationships between FIGS. 19A, 19B, and 19C, and 20A, 20B, and 20C respectively, FIGS. 19A, 19B and 19C in combination and 20A, 20B and 20C in combination are flow charts showing the operation of the image processing system according to the present invention.

DETAILED DESCRIPTION OF THE PREFERRED EMBODIMENT

FIG. 1-1 shows the configuration of an image processing system according to an embodiment of the present invention. A reader 1 has a line sensor, such as a CCD which, photo-electrically converts for readout the image information of an original. A page memory 2 comprises a semiconductor dynamic memory device which stores, in units of pages of the original of a predetermined size, the electric signals output serially from the reader 1. A printer 3 comprises a laser beam printer which forms an image on a recording medium, such as a paper sheet, based on image information which is stored in the page memory 2 and is serially output therefrom. A disk memory 4 stores all or part of the image information stored in the page memory 2. The image information is transferred from the disk memory 4 to the page memory 2. The disk memory 4 also stores image processing data. An image processing section 5 processes the image information which is output from the reader 1, the image information stored in the page memory 2, and the image information stored in the disk memory 4. A digitizer 6 is used by the operator to input image processing data to the image processing section 5. A CRT 7 displays the image processing data input from the digitizer 6 for allowing input and correction of the image processing data by the operator in conversational language. A DMA controller 9 controls DMA transfer of the image information. An image processing controller 12 comprises the page memory 2, the disk memory 4, the image processing section 5, and the DMA controller 9. A perspective view of the system of this embodiment is shown in FIG. 1-2. An image processing unit 10 comprises the reader 1; the printer 3; and the image processing controller 12 with the page memory 2, the disk memory 4, the image processing section 5, and the DMA controller 9. An image processing data generating unit 11 comprises the digitizer 6 and the CRT 7. The reader 1 and the printer 3 may be installed separately of the image processing section 5 and may be connected thereto through a transmission line such as an optical fiber cable or a metal cable.

When a point on the digitizer 6 is specified with a stylus pen 8, the coordinate data of the specified point on the digitizer 6 are supplied to the image processing section 5 which recognizes the image processing data corresponding to the received coordinate data. From an input section 6-1 of the digitizer 6, commands consisting of character, letter, and numeral strings may be input. Recording material or an original may be placed at an original table 6-2 which is shown hatched in FIG. 2.

FIG. 3-1 shows details of the panel of the digitizer 6. This embodiment will be described with reference to a case wherein recording material or an original of A4 size is used for the sake of simplicity. The area of the original table 6-2 indicated by the hatched area corresponds to the A4 size, and the original is placed thereon in alignment with a standard 6-3. In this manner, a one-to-one correspondence is established between the original table 6-2 on the digitizer 6 and image information in the page memory 2. For selecting part of the image information of the original stored in the page memory 2, the position of this part may be specified by placing the original on the digitizer 6 and actually specifying the position with the stylus pen 8. The input section 6-1 includes commands consisting of character, letter, and numeral strings. For inputting "D", the part surrounding the letter "D" is specified.

A method for specifying a portion of the image information of the original with the digitizer 6 will now be described with reference to FIG. 3-2. FIG. 3-3 shows a flow chart of the control operation of the image processing section 5 according to the output from the digitizer 6. A duplicate 15-7 as a hard copy is output by processing the image information of an original 15-1 as the basis of the image processing. In this example, the character portion of the original 15-1 is selected, and this selected portion is duplicated at the position shown in the duplicate 15-7.

When the power source of the system is turned on, the system is ready to operate upon operation of a start switch by the operator. The operator places the original 15-1 on the reader 1 and turns the start switch on in step S1. In step S2, the image information of the original 15-1 is read by scanning of the line sensor within the reader 1 and is stored as electric signals in the page memory 2. An image 15-2 is stored in the page memory 2. Then, the operator places original 15-1 on the original table 6-2 of the digitizer 6. The operator decides on a rectangle which surrounds the character portion of the original as shown in the original 15-3, and specifies with the stylus pen 8 one (e.g., point a) of the four corners of the rectangle. In step S3, the X-coordinate and the Y-coordinate of the specified point on the digitizer 6 are sensed. In step S4, a first address of the page memory 2 is set in a RAM according to the first coordinate data (x1, y1) of the point a sensed in step S3. The operator then specifies point d opposing the point a of the rectangle with the stylus pen 8 on the digitizer 6. Thus, the desired portion is defined as a rectangle, and its position and size are determined by specifying the corners of the rectangle on the digitizer 6. In step S5, the X-coordinate and the Y-coordinate of the specified point d on the digitizer 6 are sensed and the program advances to step S6. In step S6, a second address of the page memory 2 is set in the RAM according to the second coordinate data (x2, y2) of the point d sensed in step S5. In step S7, an arithmetic operation is performed based on the first coordinate data (x1, y1) and the second coordinate data (x2, y2) to combine these X- and Y-coordinates to obtain coordinate data (x2, y1) and (x1, y2) corresponding to the other corners (points b and c) of the rectangle. A third address and a fourth address of the page memory 2 are set in the RAM according to the coordinate data thus obtained. In step S8, the image information stored in the page memory 2 is accessed according to the first to fourth addresses corresponding to the respective corners of the rectangle which are set in the RAM, and the accessed image information is transferred to the disk memory 4. In this manner, the image information corresponding to the desired portion of the original which is stored in the page memory 2 is stored in the disk memory 4. Image information 15-4 in FIG. 3-2 is stored in the disk memory 4. In step S9, the contents of the page memory 2 from which the image information corresponding to the desired portion of the original has been transferred are cleared.

The operator then removes the original 15-1 from the digitizer 6, and specifies the position on the digitizer 6 with the stylus pen 8 at which he wants the selected portion of the original. Input of this position data 15-5 is performed by specifying one corner (e.g., point e) of a rectangle on the digitizer 6 as a standard as shown in FIG. 3-2. The image information in the disk memory 4 has been transferred from the page memory 2. When the image information is stored in the disk memory 4 according to the first to fourth addresses which are set in the RAM, the size of the rectangle is already determined at the index part as an offset value. Therefore, output of the image information corresponding to the rectangle may be performed by specifying one vertex of the rectangle. In step S10, the X-coordinate and the Y-coordinate of the specified point e are sensed and the program then advances to step S11. In step S11, four addresses corresponding to the four points e to h (the size of the rectangle defined by the points e to h is the same as the size of the image information 15-4 in the disk memory 4) are set in the RAM according to the coordinate data sensed in step S10. In step S12, the image information stored in the disk memory 4 is stored in the location of the page memory 2 which is specified by the four addresses which are set in the RAM in step S11.

Image information 15-6 in FIG. 3-2 is the information which is transferred from the disk memory 4 and stored in the page memory 2. In this manner, the image information obtained by selecting the character portion of the original 15-1 and transferring it to the selected position is stored in the page memory 2. When it is discriminated that a copy button is depressed in step S13, the program advances to step S14 wherein the image information 15-6 in the page memory 2 is transferred to the printer 3. The printer 3 is then driven to produce a duplicate 2-7 as a hard copy. If it is discriminated that the duplicating operation is completed in step S15, the program advances to step S16 where the duplicating operation is stopped and the system is ready for the next image processing.

In this manner, four addresses of the page memory 2 storing the image information of the original which correspond to the four corners of the rectangle specifying the desired portion of the original can be set in the RAM by specifying two opposing corners of the rectangle. Furthermore, for transferring the image information in which the size is registered as an index to the page memory 2, the four addresses of the page memory 2 corresponding to the four corners of the rectangle may be set in the RAM by specifying as a standard only one corner of the rectangle. Therefore, the present invention provides an image processing system with which addresses may be specified with efficiency and the different portions of the original may be rearranged and duplicated.

Figure 4:
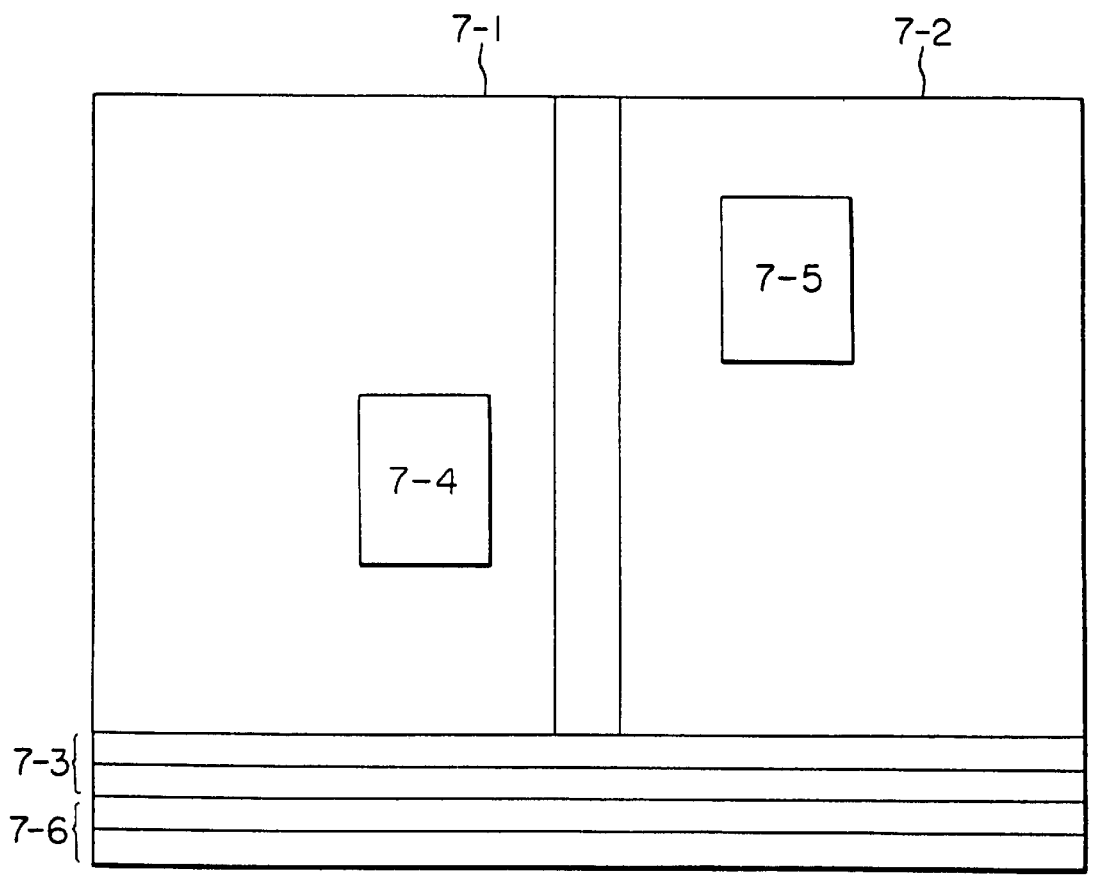
FIG. 4 is a view showing the configuration of the screen of a CRT 7.

FIG. 4 shows the configuration of a screen of the CRT 7.

The CRT 7 is a 12-inch television monitor (JC-1202DH) manufactured by NEC. An input image region 7-1 on the screen corresponds to the A4 size and is displayed in white while a region 7-4 specified by the digitizer 6 is displayed in green. An output image region 7-2 also corresponds to A4 size and is displayed in blue while a region 7-5 specified by the digitizer 6 is displayed in red. An application buffer 7-3 displays the image processing data input from the digitizer 6. A text buffer 7-6 displays the completed application file.

The mode of operation of the image processing system according to this embodiment will now be described. Essentially, the operation of this system may be summarized as desired by image processing of the image information read out from the reader 1 and output of the processed image information from the printer 3. The image processing data for performing the image processing is stored in the disk memory 4 in advance as a program by conversation with the application buffer 7-3 of the CRT 7 through the digitizer 6. The image processing is performed according to the image processing data. The program for the image processing is defined herein as an application file. As has been described with reference to FIG. 3, it is possible to input the image processing data simultaneously with the image processing in order to perform image processing in real time.

The image processing section 5 is capable of storing a plurality of application files. Each of these application files is named in two different ways: a numeral of two digits with a combination of another numeral and a blank, and 6 letters with a combination of another numeral and a blank.

The image information which is transferred from the page memory 2 and stored in the disk memory 4 according to the image processing data is herein defined as an image file. The disk memory 4 is capable of storing a plurality of image files. Each of these image files is also named in two different ways: a numeral of two digits with a combination of another numeral with a blank, and 6 letters with a combination of another numeral and a blank. These two kinds of files may be specified during storage as protected or unprotected. When "W" is input for the file, it indicates that this file is protected. When "@" is input for the file, it indicates that this file is unprotected.

The definitions of the commands for the image processing which are input from the digitizer 6 will now be described.

Figure 5:
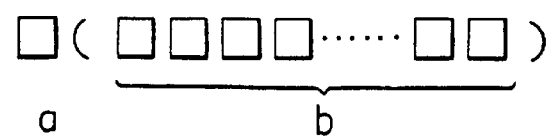
FIG. 5 is a view showing the format of a command.

The format of a command is shown in FIG. 5, which includes a command character a and a parameter b. The command is defined by one command character (letter) and a parameter of a combination in parentheses of numerals, letters and blanks. The parameter b is not always necessary and may be eliminated for some commands.

Various commands will be described below:

[Parameters on Image Quality]

As for image quality, half-tone and edge emphasis may be performed. For specifying half-tone, dither processing is performed during readout of the original. Eight kinds of dither patterns are prepared in accordance with numerals "1" to "8". The density of the half-tone may thus be specified by inputting one of the numerals "1" to "8" at the input section 6-1 of the digitizer 6. When half-tone is not specified, "@" is input. For performing edge emphasis, "E" is input from the input section 6-1 of the digitizer 6. When edge emphasis is not performed, "@" is input.

[Parameters on Coordinates]

Two parameters, for position and size, are used with the coordinates indicating the position for selecting the desired portion of the original or the desired location for this selected portion. These parameters can be input by specifying with the stylus pen 8 a desired position on the original table 6-2 of the digitizer 6. As has been discussed hereinbefore, the specified portion is displayed with a different color from the background and is also displayed by a numeral of three digits (in units of mm) in the application buffer 7-3 of the CRT 7. The parameters for position represent the standard coordinates (X-coordinate and Y-coordinate) of the desired position, and the parameters for size represent the length in the X and Y directions from the standard coordinates.

[Parameters for Transfer to Page Memory 2]

As has been described above, the image information of the original from the reader 1 and the image information from the disk memory 4 are input to the page memory 2. For synthesis of these pieces of information, "0" is input from the digitizer 6. If not, "@" is input.

One-character commands will be described below. These one-character commands may be input by specifying with the stylus pen 8 the respective characters at the input section 6-1 of the digitizer 6.

M . . . clear the page memory 2
F . . . clear the image file
R . . . read the original
P . . . output from the printer 3
L . . . load the image file in the page memory 2
S . . . store in the disk memory 4 the image information which is in the page memory 2
E . . . execute the application file
W . . . temporarily interrupt execution of the application file
Q . . . terminate the execution of the application file
A . . . change write protect status of the image file
B . . . change write protect status of the application file
T . . . transfer the application file from the image processing section and display it at the text buffer 7-6

Character string commands will now be described below.

"APC transfer" . . . transfer and store the image processing data of the application buffer 7-3 of the CRT 7 into the image processing section 5

"TEX transfer" . . . transfer the contents of the text buffer 7-6 to the image processing section 5

"EDIT" . . . move the cursor on the CRT 7 to the application buffer 7-3
"EXIT" . . . release EDIT, TRACE, POSITION and SIZE
"TRACE" . . . display the contents of the application file on the CRT 7
"ENTER" . . . transfer the contents of the text buffer 7-6 to the application buffer 7-3
"DELETE" . . . delete the character above the cursor
"CLR LINE" . . . clear the application buffer 7-3 of the CRT 7
"←" . . . move the cursor to the left by one character
"→" . . . move the cursor to the right by one character
"Screen clear" . . . clear the input image region 7-1 and the output image region 7-2 of the CRT 7
"POSITION" . . . Specify input of the position
"SIZE" . . . specify input of the size An example of image processing using the parameters, one-character commands, and the character string commands described above will be described with reference to FIG. 6. In this image processing, a region n1 of an original a and a region n2 of another original b are selected and are rearranged as shown in an original c. (The file name of the application file of the program for this image processing is 01.0)

The procedure for preparing this application file will now be described.

Figure 6:
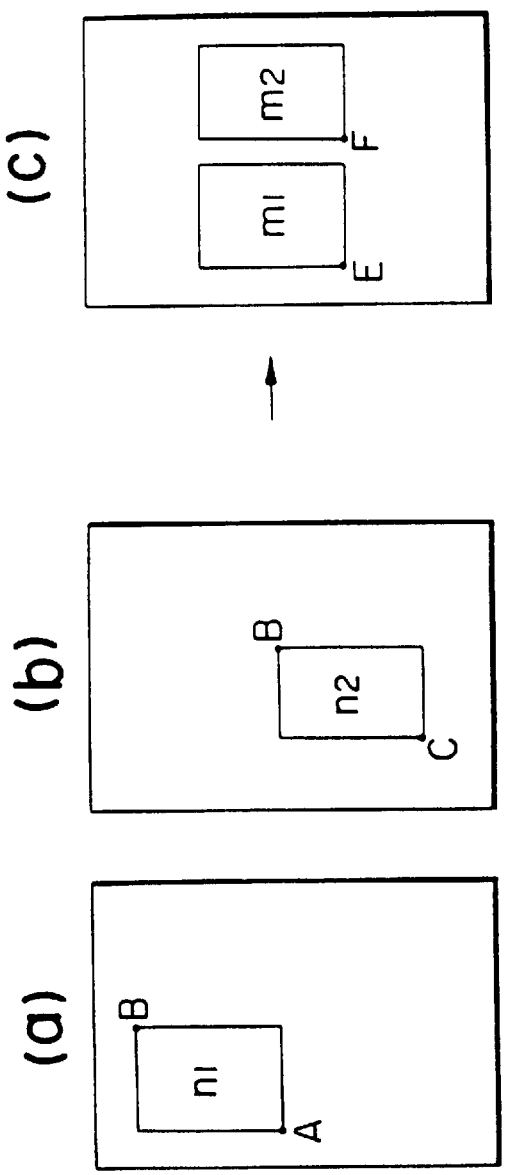
FIG. 6 is a view showing an example of image processing.

1) The original a is placed on the original table 6-2 of the digitizer 6.
2) "0" and "1" are input to name application file 01.
3) "R" is input to store the original in the page memory 2.
4) "S", "(", "0" and "1" are input to store the image information of the selected region n1 of the original a in the disk memory 4 as the image file.
5) "POSITION" is input.
6) Point (A) of the original a in FIG. 6 is specified.
7) "EXIT" is input.
(Steps 5 to 7 are for inputting the position coordinates.)
8) "SIZE" is input.
9) Point (B) of the original a in FIG. 6 is specified.
10) "EXIT" is input.
(Steps 8 to 10 are for inputting the size, that is, the distance from the position of point A.)
11) ")" is input to complete the input of the parameters for the image file 01.
12) The original a is removed from the original table 6-2 of the digitizer 6 and the original b is placed thereon instead.
13) "R" is input to store the original b in the page buffer 2.
14) "S", "(", "0" and "2" are input to store the image information of the selected region n2 of the original b in the disk memory 4 as image file 02.
15) "POSITION" is input.
16) Point (C) of the original b in FIG. 6 is specified.
17) "EXIT" is input.
(Steps 15 to 17 are for inputting the position coordinates.)
18) "SIZE" is input.
19) Point (D) of the original b in FIG. 6 is specified.,
20) "EXIT" is input.
(Steps 18 to 20 are for inputting the size)
21) ")" is input to complete the input of the parameters for the image file 02.

22) The original b is removed from the original table 6-2 of the digitizer 6 and a recording material C is placed thereon instead.

23) "L", "(", "0" and "3" are input to store the image file (content is "0") of file 03 in the page memory 2.

24) "@" and ")" are input to store the image information of the file 03 in place of the image information which is already stored in the page memory 2.

25) "L", "(", "0" and "1" are input to load the image file 01 in the page memory 2.

26) "$\overline{0}$" is input to store the image information in superposition on the image information already stored in the page memory 2.

27) "POSITION" is input.

28) Point (E) of the recording material C in FIG. 6 is specified.

29) "EXIT" is input.

(Steps 27 to 29 are for inputting the position coordinates.)

30) ")" is input to complete the input of the parameters.

31) "L", "(", "0" and "2" are input to load the image file 02 in the page memory 2.

32) "0" is input to store the image information in superposition on the image information already stored in the page memory 2.

33) "POSITION" is input.

34) Point (F) of the recording material C in FIG. 6 is specified.

35) "EXIT" is input.

(Steps 33 to 35 are for inputting the position coordinates.)

36) ")" is input to complete the input of the parameters.

37) "P", "(", "5" and ")" are input to set the number of recording sheets to 5.

38) "APC transfer" is input to transfer the application file prepared in steps 1 to 37 above to the image processing section 5 and store it in the disk memory 4.

The image processing data prepared above may be prepared by specifying the proper parts on the digitizer 6 with the stylus pen 8. Therefore, the selection and specification of particular portions of an original, and input of the command data for readout and image processing of the image may be performed on the same digitizer 6. The image processing data may thus be prepared with the same means. The image processing data which is prepared in the manner as described above, that is, the application file, is displayed at the application buffer 7-3 of the CRT 7. FIG. 7 shows this. Referring to FIG. 7, at the positions represented by squares are displayed numerals of three digits (in units of mm) which represent the X-coordinate and Y-coordinate and which are input by specifying the point on the original table 6-2 on the digitizer 6 with the stylus pen 8. For example, if the X-coordinate and the Y-coordinate of the point A of the original a are 98 mm and 63 mm, and the point B is positioned away from the point A 23 mm in the X direction and 54 mm in the Y direction, the first line in FIG. 7 becomes

01 RS(01098063023054)RS . . .

The mode of operation of the system with the application file named 01 will be summarized.

First, the original a shown in FIG. 6 is read by the reader 1 and the image information is stored in the page memory 2. The image information corresponding to the region n1 among the image information stored in the page memory 2 is transferred to the disk memory 4 with a file name of 01. The second original b shown in FIG. 6 is then read by the reader 1 and is stored in the page memory 2. The image information corresponding to the region n2 among the information stored in the page memory 2 is transferred to the disk memory 4 with a file name of 02. Thereafter, an image file with a file name 03 is transferred from the disk memory 4 to the page memory 2 (in the example of image processing described above, the image file 03 is a white image and the page memory 2 is all-cleared when this image file is transferred to the page memory 2). The image file 01 is transferred and stored in a region m1 of the page memory 2, and the image file 02 is transferred and stored in a region m2 of the page memory 2. In this manner, the image information which corresponds to one page and which includes the image information n1 and n2 arranged as shown in FIG. 6C is prepared in the page memory 2.

All the contents of the page memory 2 are output to the printer 3 and the printer 3 records the contents on five recording sheets. By the final input of "APC transfer" from the digitizer 6, the application file for the image processing as described above is stored and registered in the disk memory 4 with a file name of 01.

For driving the image processing system with the image processing information (application file) which is stored in the disk memory 4, a drive initiating command is input from a control panel 13 at the image processing unit 10 shown-in FIG. 1-2. FIG. 8 shows the details of the control panel 13. A two-digit display 13-1 displays the file name of the application file. A count display 13-2 displays the desired number of duplicates to be printed at the printer 3. A keyboard 13-3 is used for setting numerals to set the file names and desired number of duplicates. An ENTER key 13-4 is for inputting the numeral set at the keyboard 13-3. An EXCUT key 13-5 is for initiating the execution of the image processing. When a STOP key 13-6 for interrupting the image processing in progress is depressed, the system is placed under the wait status after completing the work in progress.

The control panel 13 also has lamps to indicate the status of the image processing unit 10. A lamp 13-7 indicates that the application file which is input at the keyboard 13-3 and whose name is displayed at the display 13-1 is not stored or registered in the disk memory 4. A lamp 13-8 indicates jamming of recording sheets in the system for feeding the recording sheets in the printer 3. A lamp 13-9 indicates jamming of the original in an automatic original feeder when the automatic original feeder is used to automatically feed the original to the reader 1 and to eject the original after readout. A lamp 13-10 indicates that there are no recording sheets left in the printer 3. A lamp 13-11 indicates an insufficient supply of toner. A lamp 13-12 indicates that the image processing system is not under the wait status. When one or more of these five lamps except the lamp 13-11 are lit, the reader 1 and the printer 3 do not operate. When one or more of these lamps are lit during operation, the system is interrupted after the operation in progress is completed.

A description will now be made of an example of image processing according to the application file prepared in the manner described above and stored in the disk memory 4. In this example, the image processing of an application file with a file name 23 is performed and five duplicates are produced. Since the image processing information for the image processing is stored in the disk memory 4 as an application file, the application file 23 in this case is accessed from the disk memory 4 and is transferred to a sequence RAM in a CPU of the image processing section. The desired number of duplicates, 5, is set. The original is set at the reader 1 to complete the preparations for the image processing. Then, the image processing system provides instructions to the operator for key operation. For inputting the file name of the application file, the display 13-1 for display of the application file name flashes. For inputting the desired number of duplicates, the count display 13-2 flashes. The operator may then input the corresponding required information. This will be described in more detail below.

1. The display 13-1 for displaying the application file name flashes with a display of "00".
2. The operator depresses "2" and "3" corresponding to the file name at the keyboard 13-3.
3. The display 13-1 flashes and displays "23".
4. The operator depresses the ENTER key 13-4.
5. The display 13-1 stops flashing and displays "23". Simultaneously, the count display 13-2 flashes with a display of "00".
6. The operator depresses the desired number of duplicates, "5", at the keyboard 13-3.
7. The display 13-2 flashes and displays "05".
8. The operator depresses the ENTER key 13-4.
9. The display 13-2 stops flashing and displays "05".
10. The operator depresses the EXCUT key 13-5.
11. The system starts operating.

For performing the image processing according to an application file which is already stored in the disk memory 4, the image processing may be performed without the image processing information generating unit comprising the digitizer 6 and the CRT 7.

FIG. 9 shows a block diagram of the embodiment shown in FIG. 2 showing the reader 1, the printer 3, the digitizer 6, the CRT 7, and the image processing controller 12 mainly consisting of the page memory 2, the disk memory 4, the image processing section 5, and the DMA controller 9 shown in FIG. 1-1.

A multibus 12-10 is included in the image processing controller 12. The circuit blocks which have priority in using the multibus 12-10 and control the other circuits will be called master function blocks. The circuit blocks which do not belong to this category will be called slave blocks. Four circuit blocks are connected to the multibus 12-10, that is, a CPU circuit block 12-1, the DMA controller 9, a page memory circuit block 12-3 with a semiconductor buffer memory, and a reader & printer sequence controller 12-4. Of these, the CPU circuit block 12-1 and the DMA controller 9 are master function blocks, and the page memory circuit block 12-3 and the reader & printer sequence controller 12-4 are slave function blocks. These four circuit blocks are connected to the multibus 12-10 through multibus lines 12-12, 12-13, 12-14 and 12-15. Interruption lines 12-16 to 12-20 are for input of information from the DMA controller 9, the reader & printer sequence controller 12-4, a dither controller 12-9, a shift memory 12-5, and the page memory circuit block 12-3 to the CPU circuit block 12-1. Image information obtained by photoelectric conversion by two line sensors CCD1 and CCD2 of the reader 1 are transferred through image signal lines 12-21 and 12-22. The information on the dither of the image quality processing is output from the dither controller 12-9 through a line 12-23. The image information obtained from the line sensors CCD1 and CCD2 is A/D converted according to a predetermined threshold for edge emphasis. This image information is A/D converted according to the signal from the dither controller 12-9 when the half-tone is specified. The transfer of image information which is processed for these effects and the control information for this image processing are transferred through lines 12-24 and 12-25. The control information and the image signals for one scanning operation obtained from the parallel image signals of the lines 12-24 and 12-25 are transferred to.the page memory circuit block 12-3 through a line 12-26. A refresh trigger signal line 12-27 is for outputting from the CPU circuit block 12-1 a refresh trigger signal to the dynamic page memory 2 in the page memory circuit block 12-3. A selection signal for selecting one of two banks of the page memory 2 is supplied through a selection signal line 12-28. An interval signal line 12-29 is for transmitting an interval signal indicating the interval during which the image information is input or output from the shift memory 12-5 to the page memory circuit block 12-3. Ser. image information is output from the page memory circuit block 12-3 to the printer 3 through a line 12-30. A signal for forcibly turning on a laser to obtain a horizontal hold signal, and a video blank signal for turning on the laser of the printer 3 in the nonimage region in the case of background scanning, are transmitted through a signal line 12-31. The coordinate information of a region of the original specified for half-tone processing by the dither controller 12-9, and a signal determining the dither, are transmitted through a signal line 12-32. The coordinate information on the digitizer 6 is transferred to the CPU circuit block 12-1 through a line 12-23. The file information in the disk memory 4 is sent from the CPU circuit block 12-1 to a CRT & digitizer controller 12-8 through this line 12-33. The coordinate information from the digitizer is input to the CRT & digitizer controller 12-8 through a line 12-34.

A video signal is output from the CRT & digitizer controller 12-8 through a video signal line 12-35. Signals to be processed by a processor in the reader & printer sequence controller 12-4 are transmitted through a signal line 12-36. An interface 12-6 converts output signals from various sensors incorporated in the reader 1 and the printer 3 into forms which allow input to the reader & printer sequence controller 12-4. The interface 12-6 also outputs drive signals to a motor, heater, laser and so on. A signal for driving an optical scanning motor of the reader 1 is transmitted through a signal line 12-37. A signal from a position sensor in the reader 1 is transmitted through a signal line 12-38. A line 12-39 carries key and display signals from the control panel 13. A line 12-40 is for detection of rotation of the scanner at the printer 3. A line 12-41 is for detection of the laser temperature for stabilizing the laser. A signal line 12-42 transmits a signal for driving the printer 3 and other signals to various sensors. The page memory circuit block 12-3 has, as the image information transfer lines, two lines which are not connected to the multibus 12-10, that is, the line 12-26 for inputting serial image information from the reader 1 and the line 12-30 for outputting the serial image information to the printer 3; and the line 12-14 connected to the multibus 12-10. Due to this construction, even while image information is input from the reader 1 or output to the printer 3, the CPU circuit block 12-1 connected to the multibus 12-10 can execute the operations related to image processing.

In summary, prior to actually driving the image processing system, image processing information (such as the area of an original to be subjected to image processing, the nature of image processing, the area of a recording sheet for printout, the file name of the image information for storage in the image processing section, and the file name of a set of image processing information) are specified with the stylus pen 8 on the digitizer 6 with the CRT 7. Therefore, an image processing system may be provided which is capable of easily performing image processing without requiring complex hardware and with simple operation, and which is capable of generating image processing information with a single means for specifying the positions of a selected area of the original or for other image processing procedures. Furthermore, a page memory comprises a semiconductor dynamic memory which stores the image information corresponding to one page of the original read by the line sensors of the reader 1. Therefore, the image information from the reader 1 may be directly input to the memory means without requiring an intermediary means such as an intermediate buffer.

The same applies to output of the image information to the printer 3. The reading of the image information in and out of the memory means may be performed at high speed.

FIG. 10 shows the details of the CRT & digitizer controller 12-8. The CRT & digitizer controller 12-8 comprises an APPLE II manufactured by APPLE Co. Ltd. FIG. 10 shows a block diagram of APPLE II. Refer to the manual of the APPLE II for further details.

FIG. 11 shows the details of the CPU circuit block 12-1 shown in FIG. 9. The CPU circuit block 12-1 comprises a single board computer SBC 86/12 manufactured by Intel Co. Ltd. FIG. 11 shows a block diagram of the SBC 86/12. Refer to the manual of the SBC 86/12 for further details. The control of the CPU circuit block 12-1 is performed mainly with a CPU 8086, and a program for this control is stored in a ROM in advance. In addition, as has been described herein-before, the interruption signals from the respective blocks of the image processing controller 12 may be input through the interruption lines 12-16 to 12-20. The CPU 8086 controls the respective blocks by discriminating these interruption signals.

FIG. 12 shows the details of the reader & printer sequence controller 12-4 shown in FIG. 9. This controller 12-4 comprises a single board computer SBC 569 manufactured by Intel Co. Ltd., and FIG. 12 shows the details of this SBC 569. Therefore, refer to the manual of the SBC 569 for further details. As has been described hereinbefore, the controller 12-4 interrupts the CPU circuit block 12-1 through the interruption line 12-17. The CPU circuit block 12-1 may be interrupted so as to provide access to the controller 12-4.

FIG. 13 shows the details of the DMA controller 9. An IO processor 9-1 has a DMA function and comprises an Intel 8089. The IO processor 9-1 is the main part of the controller 9. For details of the IO processor 9-1, refer to the manual of the Intel 8089. A bus arbiter 9-2 comprises an Intel 8289 which is coupled to the multibus line 12-13 according to the status information from the IO processor 9-1 to acquire priority on the multibus line 12-13. After the use of the multibus line 12-13, the bus arbiter 9-2 frees the multibus line 12-13. Refer to the manual of Intel 8289 for further details. A bus controller 9-3 comprises an Intel 8288. The bus controller 9-3, after acquiring priority on the multibus line 12-13 through the bus arbiter 9-2, inputs or outputs the address and data signals to the multibus line 12-13 and outputs a memory write command MWTC and a memory read command. Since the DMA controller 9 has the bus arbiter 9-2 and the bus controller 9-3, it has a master function with respect to the multibus line 12-13, that is, it is capable of accessing the multibus line 12-13. Therefore, the slave function block does not have these two devices and can only access them through the multibus line 12-13. Refer to the manual of the Intel 8288 for further details of the bus controller 9-3. A clock generator 9-4 comprises an Intel 8284 which has an external oscillator as input means, and supplies a clock signal of a predetermined frequency to the IO processor 9-1, the bus arbiter 9-2, and the bus controller 9-3. The clock generator 9-4 also receives a memory OR I/O acknowledge signal (response to a write or read signal from the memory or I/O) signal from peripheral equipment as information for discriminating when the bus cycle enters the wait state and for discriminating the release from the wait state, and outputs a ready signal according to the received memory OR I/O acknowledge signal. Refer to the manual of the Intel 8284 for further details. An internal bus 9-5 of the controller 9 is a local bus for the multibus line 12-13. The internal bus 9-5 has an address bus of 16 bits, an address space of 64 k bytes, and a data bus of 8 bits. An address/data buffer 9-6 has two address/data buffers, one for the multibus line 12-13 and the other for the internal bus 9-5. The address or data information output from the IO processor 9-1 is multiplexed and time-divided. Thus, first the address information is output, and then the data information is output. Therefore, the basic function of the buffer 9-6 is to latch the address information in the address buffer and to transfer or to read in the subsequently output data information according to whether the output data information is a read command or a write command. The address information is already output to the address/data line from the IO processor 9-1 at a timing at which an address latch enable signal ALE is output from the bus controller 9-3. Therefore, the former buffer latches the address information in the address buffer in response to this address latch enable signal ALE.

If the priority on the multibus line 12-13 is already acquired by the bus arbiter 9-2, the bus arbiter 9-2 generates an address enable signal AEN. In response to this address enable signal AEN, the address buffer outputs the latched address information to the multibus line 12-13. If this address information is for a write command, the IO processor 9-1 outputs the address information on the address/data line, and if priority on the multibus line 12-13 is already acquired at this point, outputs the information. Then, the bus controller 9-3 outputs a data enable signal DEN and outputs the data information together with the address information to the multibus line 12-13 through the data buffer. Since a switch signal between transmission and reading at this instant is output as a DT/R signal (data transmit-read signal) from the bus controller 9-3, data information is transferred to the multibus line 12-13 in response to this. In the case of a read command, the bus controller 9-3 does not output a DEN signal, and the data buffer puts the DT/R signal in the read mode to output the data information for the multibus line 12-13 on the address/data line of the IO processor 9-1. The reading in of this data by the IO processor 9-1 is performed after a transfer acknowledge signal XACK from the accessed memory is confirmed.

The timing for latching the address in the address/data buffer for the internal bus 9-5 is the same as described above. The address buffer for the multibus line 12-13 and the address buffer for the internal bus 9-5 equally latch the address information output from the IO processor 9-1, irrespective of which bus is to be accessed. However, a signal for outputting or not outputting is generated in response to the AEN signal from the bus arbiter 9-2 only in the case of the multibus line 12-13. Whether or not to enable the output of the data buffer for the internal bus is determined by a peripheral data enable signal PDEN from the bus controller 9-3. A switch between the transmission and reading is determined according to the mode of the DT/R signal from the bus controller 9-3, as in the case of the data buffer for the multibus line 12-13. When the IO processor 9-1 accesses the peripheral units (memories and I/Os) in the block, a sync signal generator 9-7 confirms the responses from these units, so that the IO processor 9-1 may initiate the next operation only after this confirmation. The clock generator 9-4 outputs these response signals as ready signals to the IO processor 9-1 in synchronism with the bus cycle of the IO processor 9-1. A ROM 9-8 has two 2716 memories with 4 k bytes and stores a microprogram of the IO processor 9-1. An I/O part 9-9 has two 8212 devices and controls the peripheral equipment. In this embodiment, the I/O port 9-9 does not control any part and is opened. An address decoder 9-10 decodes part (the upper bits) of the address information of the internal bus 9-5. for generating a chip selection signal for selection of the ROM 9-8 or the I/O port 9-9. A disk unit 9-11 of the disk memory 4 is a hard disk unit whose memory capacity is 10M bytes and which has 350 tracks, one track having 18 sectors and each sector having a capacity of 512 bytes. The disk unit 9-11 has a disk controller and interfaces with an 8-bit data bus. The model name of the disk unit 9-11 is WDS-10 manufactured by Sord Computer Inc. Refer to the manual of WDS-10 for details. An address/data line 9-12 of the IO processor 9-1 is capable of time-divisionally outputting address information and data information on the same line. The address information is output first and the data information is output next. The address information and the data information are output to the internal bus 9-5 through a signal line 9-13. The address information and the data information are output to the multibus line 12-13 through a signal line 9-14. A status information signal is output from the IO processor 9-1 to the bus arbiter 9-2 and to the bus controller 9-3 through a signal line 9-15. A channel attention signal CA as a DMA request signal from the CPU circuit block 12-1 and a system interrupt signal SINTR for signalling that the DMA transfer is completed from the IO processor 9-1 to the CPU circuit block 12-1 are transmitted through a signal line 9-16. This signal SINTR is input to the interrupt terminal of the CPU circuit block 12-1. A signal line 9-17 is for transmitting the address latch enable signal ALE which is output by the bus controller 9-3 to the address/data buffer 9-6 according to the status information from the IO processor 9-1, the peripheral data enable signal PDEN, the data enable signal DEN, and the data transmit/read signal DT/R. A signal line 9-18 is for outputting the address enable signal AEN, which is a signal for outputting the latched address information to the multibus line 12-13, to the address/data buffer 9-6, after the bus arbiter 9-2 acquires priority on the multibus line 12-13 according to the status signal from the IO processor 9-1. A bus request signal and a bus priority signal for use of the multibus line 12-13 are transmitted through a signal line 9-19. The order of priority of the master function circuit blocks for using the multibus line 12-13 is determined in advance. In this embodiment, the CPU circuit block 12-1 has the highest priority and the DMA controller 9 has the second highest priority. When the bus arbiter 9-2 generates a bus request signal BREQ for the multibus line 12-13, if the CPU circuit block 12-1 with higher priority is not using the multibus line 12-13, the bus priority-in signal BPRN is returned indicating that the multibus line 12-13 may be used. When the bus arbiter 9-2 confirms this, the bus arbiter 9-2 outputs a busy signal representing that the bus is in use. A signal line 9-20 transmits the transfer acknowledge signal XACK as a response signal to accessing of the external memory or I/O through the multibus line 12-13. A signal line 9-21 transmits a switch signal to access selectively either an odd bank or an even bank of a memory according to whether the byte information of an odd address is accessed (data is output to the upper byte of the data bus) in response to a byte high enable signal BHEN output together with the address information during access of memory by the IO processor 9-1, or the-word information of 16 bits at an even address is accessed (byte data at the even address is output to the lower byte of the data bus, and byte data at the odd address is output to the upper byte of the data bus). A clock signal is transmitted through a line 9-22, and a power on reset signal and a manual reset signal are transmitted through a line 9-23. A ready signal synchronous with the bus cycle of the IO processor 9-1 is transmitted through a line 9-24. A line 9-25 transmits the memory write command MWTC and a memory read command MRDC for outputting the address information together with the data information when accessing the multibus line 12-13. A line 9-26 transmits the signal ALE from the bus controller 9-3 and a signal S2 which is a signal of status information. As has been described hereinbefore, the address information is latched in the address buffer for the multibus and in the address buffer for the internal bus, irrespective of which of the buffers is accessed. Therefore, it becomes necessary to discriminate if the content latched in the address buffer for the internal bus is the address information for the internal bus. This discrimination is performed by the address decoder 9-10 according to the signal S2. The signal S2 is the discriminating information. When the signal S2 is level at "1", it indicates that the content in the address buffer for the internal bus is the address information for the multibus line 12-13. If the signal S2 is at level "0", it indicates that the content is the address information for the internal bus. This signal S2 is latched by the signal ALE and is held.

A line 9-27 transmits an I/O read command IORC which is output from the bus controller 9-3 when the IO processor 9-1 accesses data in the internal bus 9-5 in the read mode, and also transmits an interrupt acknowledge INTA signal and the signal ALE which are output from the bus controller 9-3 when a microprogram is fetched from the ROM 9-8. The sync signal generator 9-7 generates a discriminating signal to indicate the read mode when the IO processor 9-1 accesses the internal bus 9-5 in response to the signal IORC and the signal INTA. The signal ALE is used for clocking the sync signal generator 9-7. A line 9-28 is a data bus; one address corresponds to command information, result information and data information, and another address corresponds to status information. The former three pieces of information are differentiated by being input and output sequentially by the disk unit 9-11. A line 9-29 is for the two pieces of address information described above. A line 9-30 is for a command busy CBUSY signal which is a discriminating signal for the two addresses described above. The timings at which the data is ready are different in the read mode and in the write mode for the command information, the result information and the data information in the disk unit 9-11. Furthermore, the timings at which the data becomes ready are different in the read mode and in the write mode for the status information. Therefore, the signal from the line 9-30 and the signal from the line 9-27 are input to the sync signal generator 9-7 in order to generate four different wait times for the IO processor 9-1. A line 9-31 is for the ready signal described above. A line 9-32 is for a data request signal DREQ which indicates that the disk unit 9-11 is ready and an external terminate signal EXT which indicates the completion of the DMA transfer. A line 9-33 is a data bus line (8 bits) for the I/O port 9-9. A line 9-34 is for the upper significant bits of the address information for generating a chip selection signal of the ROM 9-8 and the I/O, and a line 9-35 is for the lower significant bits of the address information which represents the address in the ROM 9-8. A line 9-36 is a data signal line for an instruction code fetched from the ROM 9-8, which is output on the data line. A line 9-37 is for a chip selection signal for the I/O port 9-9, and a line 9-38 is a chip selection signal for the ROM 9-8.

The flow of information during the DMA transfer in FIG. 13 will be described based on the above description.

1) The CPU circuit block 12-1 supplies calls for channel attention to the IO processor 9-1 through the line 9-16.
2) The IO processor 9-1 accesses the dual port RAM in the CPU circuit block 12-1 through the lines 9-12 and 9-14 to obtain the mode and address information for the DMA.
3) The IO processor 9-11 accesses the page memory 2 through the lines 9-12 and 9-14.
4) The 16-bit data on the multibus line 12-13 which is read out from the page memory 2 is retrieved in the IO processor 9-1 through the multibus line 12-13 and the lines 9-14 and 9-12.
5) The IO processor 9-1 fetches the upper significant 8 bits of the 16-bit data in the disk unit 9-11 through the lines 9-12 and 9-13, the internal bus 9-5, and the line 9-28.
6) The IO processor 9-1 retrieves the lower significant 8 bits in the disk unit 9-11 through the same route as in step 5).
7) Steps 3) and 6) are repeated until the signal EXT is output to the signal SINR.
8) A signal SINR from the line 9-16 interrupts the CPU circuit block 12-1 to signal the completion of the DMA transfer.

In this manner, the image information is DMA transferred between the page memory 2 and the disk memory 4 (disk unit 9-11). The DMA controller 9 for control of the DMA transfer has a master function to control the multibus 12-10, according to which the page memory 2 in the page memory circuit block 12-3 as the slave function circuit block may be accessed. Therefore, the CPU circuit block 12-1 can execute other operations required for image processing during the transfer of the image transfer.

Between the two circuit blocks with the master functions, that is, the CPU circuit block 12-1 and the DMA controller 9, the CPU circuit block 12-1 has the priority to use the multibus 12-10. Therefore, even if the DMA controller 9 requests the DMA transfer which involves the use of the multibus 12-10, the DMA transfer is prohibited if the preprocessing by the CPU circuit block 12-10 using the multibus 12-10 for the image processing and operation of the respective parts is not completed. The competition on the multibus 12-10 due to signals from a plurality of blocks may be prevented.

[Memory Space of the Multibus]

The memory maps in the four circuit blocks related to the multibus 12-10 will be described. The CPU circuit block 12-1 includes a 32-k byte dual port and an 8-k byte ROM as a program memory of the CPU 8086. The page memory 2 has a capacity to read the image of an A4 size document at 12 pel/mm, that is, 8,709,120 bits (725,760 words when 12 bits are 1 word). The reader & printer sequence controller 12-4 has a dual port RAM which has a capacity of 2 k bytes. These memories are all memory-mapped memories and can be accessed from the multibus line 12-13 by the memory write command MWTC and the memory read command MRDD. The internal bus of the reader & printer sequence controller 12-14 also has a 4 k byte program memory ROM for the CPU 8085 and has the slave function for the multibus line 12-13. Therefore, an address from the CPU 8085 is not output to this multibus line 12-13.

The DMA controller 9 has, on its internal bus 9-5, a 4-k byte ROM which is a program memory for the IO processor 9-1. The memory is an I/O mapped memory. Therefore, even if the IO processor 9-1 accesses this ROM, its address is not output on the multibus line 12-13 and it is not possible to access this memory from the multibus line 12-13.

FIG. 14 shows the memory map related to the multibus line 12-13. The address space of the multibus line 12-13 is a memory-mapped memory space of 1 M byte from 00000 to FFFFF one address corresponding to 1-byte data. 8 k byte from FE000 to FFFFF of this address space is the program memory space for the CPU 8086 in the CPU circuit block 12-1. The page memory 2 has a capacity of 725,760 words, as has been described hereinbefore, which is 1,451,520 bytes. This buffer memory space exceeds the memory space of 1 M byte. Therefore, the buffer memory space is divided into two banks, each having an address space of 725,760 addresses. The switching between both banks is performed by the hardware, that is, in response to the signal (line 12-28 in FIG. 9) from the CPU circuit block 12-1. The space for the bank 0 corresponds to 0A000 to BB2FE and the space in the bank 1 corresponds to 0B300 to BC5FF. The main purpose of the dual port RAM of 2-k byte capacity in the reader & printer sequence controller 12-4 is for communication between the CPU 8085 within the block and the CPU 12-1. The address space of 08000 to 087FF is assigned for this RAM. Since this RAM has a 64-k byte space as the address space for the CPU 8085 to access this RAM, the CPU 8085 provides the same addresses of 08000 to 078FF.

The 8-k byte capacity of the 32-k byte dual port RAM in the CPU circuit block 12-1 is used for communication between the CPU 8086 within this block and the DMA controller 9, and 06000 to 07FFF are allocated as the address space. The addresses for accessing this space from the CPU 8089 are different and are FF800 to FFFFF. Thus, 06000 corresponds to FF800 and 07FFF corresponds to FFFFF. When the addresses FF800 to FFFFF are input to the CPU circuit block 12-1, the address codes are converted to 06000 to 07FFF through the ROM in a hardware manner. To the remaining 24 k byte of the dual port RAM are assigned addresses 00000 to 05FFF as the address space.

The memory space for the multibus 12-10 has been as described above. To the address space of the 4k byte ROM in the reader & printer sequence controller 12-4 are assigned addresses 00000 to 00FFF as the memory-mapped memory. To the address space of the 4k byte ROM in the DMA address controller 9 are allocated 00000 to 00FFF as the I/O mapped memory.

[Structure of Page Memory]

FIG. 15-1 shows the address map of the page memory 2 in the page memory circuit 12-3. The page memory 2 has a function to store information obtained by decomposing the image information of A4 size (288 mm×210 mm) into 12 picture elements per 1 mm. The direction of the main scanning of the original with the reader 1 is the longitudinal length, 288 mm. Since the image information is divided into 12 picture elements per 1 mm and is output from the CCD, picture elements of 3,456 picture elements are input to the page memory 2 per one scanning operation. The direction of scanning is the transverse direction, 210 mm. Since there are 12 scanning lines per 1 mm, 2,520 scanning operations are performed for scanning one A4 size original. The memory capacity is 8,709,120 bits. Therefore, the picture elements of 3,456 bits are serially input 2,520 times per A4 size document.

Assignment of addresses and storage of the image information thus input will now be described. The original is divided into unit square blocks of 1 mm×1 mm. This unit block is defined as a memory block and the A4 size original is thus constituted with 60,480 blocks. The memory block contains 12 bit×12 line, that is, 144 bit image information. When 12 bits are regarded as one word and are assigned one address, the memory block consists of picture elements having 12 addresses. The entire memory space has 725,760 addresses from 0 to 725,759 addresses, thus providing addresses 00000 to B12FF in the HEXA code. The 3,456-bit serial image information corresponding to one scanning line is divided into 12-bit picture elements corresponding to 1 mm. The first picture element group is stored in the address 00000, the next 12-bit picture element group is stored in the address 0000C. The subsequent picture element groups are stored in addresses 00018, 00024, . . . , and the last 12-bit picture element group of the first scanning line is stored in the address 00D74. In this manner, the image information obtained by one scanning line is divided into 12-bit picture element groups and these picture element groups are stored in every 12th addresses. When the 3,456-bit serial image information for the next scanning line is input, it is divided into 12-bit picture element groups as in the case of the image information of the first scanning line. Each of the picture element groups is stored at every 12th address from the address 00001 to the address 00D7F. In the similar manner, the image information for the original 288 mm in length and 1 mm in width is stored in the consecutive addresses, 00000 to 00D7F addresses. The 3,456 bit image information for the 13th scanning line is also divided in a similar manner and is stored in every 12th address from 00D80 address. The image information is stored in this manner, and the last 12 bits of the 2,520th line is stored in the address B12FF.

When the storing method in addresses as described is adopted, the entire A4 original is stored in the consecutive addresses in units of squares having dimensions of 1 mm×1 mm. Therefore, the image processing area may be specified by the digitizer 6 in units of mm. For this reason, the specified area can be filed in the disk memory 4 by the DMA transfer, by only setting the initial address and the final address, and at high speed without the use of CPU.

By specifying a pair of an initial address and a final address, the image information for 12 main scanning lines may be DMA transferred. Selection of the image information of 1 mm width may be performed by specifying the initial address and the final address once. Therefore, setting of addresses for DMA transfer may be reduced in number and the transfer may be achieved at high speed. This is more effective for selection of particular portion of the image information. Since the addresses are continuous from the right side to the left side of the image, the address setting by the CPU may be reduced to 20 times for the selection of an area which is 20 mm in vertical direction.

Since the address corresponds to the image in units of mm, the address setting may also be performed in units of mm, which is quite convenient for the operator. In this embodiment, since line sensors which are capable of reading 12 bits per 1 mm are used, one address corresponds to 12 bits. However, this number of bits may be varied depending upon the capacity of the line sensor. Furthermore, it is also possible to set the addresses in units other than mm such as inch to obtain the similar effects. Setting of the initial address for each line in the page memory 2 is accomplished by setting by the CPU the initial value in the address counter. When outputting the image information from the page memory 2 to the laser beam printer 3, the image information is read out from every 12th address from the initial address as in the case of input.

An example of DMA transfer of information of a desired area from the page memory 2 to the disk memory 4 will now be described with reference to FIG. 15-2.

As has been described hereinbefore, the transfer of the image information between the page memory 2 and the disk memory 4 is performed by the DMA transfer. When a need for DMA transfer arises, the image processing section 5 sends a DMA request signal to the DMA controller 9. In response to this signal, the DMA controller 9 outputs a hold command to the image processing section 5. By the hold command, the image processing section 5 becomes disconnected from the multibus.

The DMA controller 9 starts transfer of the image information without the intermediacy of the image processing section 5, according to the initial address and the final address on the page memory 4 which are set in advance based on the image processing information generated by the digitizer 6. Since the image information has consecutive addresses, when the initial address and the final address are specified once by the image processing section 5 prior to the DMA transfer, the information between these two addresses is transferred at high speed and without intermediacy of the image processing section. When the storing method according to the memory map as shown in FIG. 15-1 is used, when transferring the required portion of the image information from the page memory 2 to the disk memory 4, the image processing section 5 specifies the initial address and the final address for DMA transfer once. Then, the image signals corresponding to the 12 main scanning lines of the line sensor, that is, the image information of 1 mm width are transferred from the page memory 2 to the disk memory 4. According to the structure of the address map in the page memory 2, consecutive 12 addresses (e.g., 00000 to 0000B) are assigned to every unit square block of 1 mm×1 mm of the original, and the initial address of the adjacent block in the main scanning direction is the next address (e.g., 0000C) of the last address (e.g., 0000B) of the preceding block. Therefore, the readout of the image information from the page memory 2 is performed for each picture element group in units of blocks. Thus, the image information corresponding to 12 scanning lines is output by specifying the initial address and the final address once.

FIG. 15-2 shows part of the address map of the page memory 2 shown in FIG. 15-1. A description will be made of a case wherein the image information stored in the addresses indicated by hatched lines in FIG. 15-2 is transferred. The initial addresses of the desired portion are X1, X2, X3 and X4, and the final addresses are Y1, Y2, Y3 and Y4. When the image processing section 5 specifies the addresses X1 and Y1 at the first address setting, the image information in the unit blocks starting from the address X1 is read out and the adjacent unit blocks are read out to the address Y1. The first DMA transfer is thus completed. When addresses X2 and Y2 are set by the second address setting by the image processing section 5, the image information in the unit blocks starting from the address X2 is read out and the adjacent unit blocks are read out to the address Y2. The second DMA transfer is thus completed. In a similar manner, the image information stored at the addresses indicated by the hatched lines is DMA transferred by the third address setting of the addresses X3 and Y3 and the fourth address setting of the addresses X4 and Y4. In this manner, the image information corresponding to 12 scanning lines may be read out by setting the initial address and the final address once.

According to the storing method according to the address map of the present invention, the DMA transfer may be performed at high speed and the time required for image processing may be reduced to the minimum.

DMA transfer from the disk memory 4 to the page memory 2 will now be described. As in the case of the DMA transfer as described above, the image information corresponding to the 12 scanning lines is transferred by one address setting operation. When outputting the selected image information at the same position as the original, the address obtained when inputting the image information from the reader 1 to the page memory 2 may be used. However, when transferring the selected image information to a different position, the addresses must be converted into those on the address map of the page memory 2 corresponding to the desired position. An address converter is incorporated in the page memory 2 for this purpose. The image signals output from the disk memory 4 are converted into the required addresses and are stored in the page memory in units of square blocks of 1 mm×1 mm.

In this manner, the image information selected from the original is stored in the page memory 2, and this image information is then transferred to the printer 3. In this case, the opposite operation to the address assigning operation for sending the image information from the reader 1 to the page memory 2 is performed. The image signals for every 12th address is read out by the address counter from the page memory 2 and is output serially through a 11-bit parallel-in serial-out shift register. In this manner, the serial image signals for one scanning line are input to the printer 3 which produces a duplicate based on the received image information.

Since the original is stored in the page memory in units of square blocks of 1 mm×1 mm, a desired portion of the original may be selected in units of 1 mm.

In this embodiment, the number of the picture elements read out by the line sensor is 12 bits. However, the present invention is by no means limited to this particular construction. Furthermore, if the number of picture elements for 1 mm increases, a predetermined number of addresses may be assigned in units of 1 mm×1 mm, so that the DMA transfer of the image information of 1 mm width may be performed upon one address setting operation. In this embodiment, the address map of the image memory consists of square blocks of 1 mm×1 mm dimensions. However, similar effects may be obtained with the unit blocks of other dimensions.

FIG. 16 shows the address map when the page memory 2 is viewed from the multibus 12-10. The address space of 00000 to 5897F in FIG. 15 corresponds to bank 0, and the address space of 58980 to B12FF corresponds to the bank 1. These address spaces correspond to address spaces 0A000 to BB2FE and 0B300 to BC5FE. The multibus 12-10 has a 16-bits dat bus and a 20-bit address bus. The area which may be accessed with these buses is limited to 1 M byte. Therefore, 8-bit data numbering 1M may be accessed. Since 16-bit data involves two addresses, 16-bit data may be input or output only when an even address is accessed in the word mode. For this reason, as may be seen from FIG. 16, consecutive addresses are assigned for every other address. The real addresses in the page memory 12-3 are the addresses, shown in FIG. 15. Therefore, the page memory 2 has a circuit to convert the address in the page memory 2 from the multibus with the addresses shown in FIG. 16 into the addresses shown in FIG. 15 in a hardware manner. With this address converting circuit, the address region of the page memory 2 may be set at any address space.

FIG. 17 shows the contents in the page memory 12-3. As may be seen from FIG. 17, the page memory 12-3 consists of five circuit units of a memory controller 2-1, a memory A2-2, a memory B2-3, a memory C2-4 and a terminator 2-5. These five units are all connected by the internal bus 2-6. The memory controller 2-1 is also connected to the multibus line 12-14, so that the page memory 12-3 may be accessed from the multibus line 12-14 as a slave function. A bank switch signal is supplied to the CPU circuit block 12-1 through a line 12-28. Serial image information is input from the shift memory 12-5 through a line 12-26, and image signals are output to a laser drive of the printer 3 through a line 12-30. The memories A2-2, B2-2 and C2-3 and 16-k dynamic RAMS have a capacity of 256 words when 12 bits are one word. Since these memories comprise IM1440IMG manufactured by Nissei Electronics Co., Ltd., refer to the manual for IM1440IMG. To the internal bus 2-6 are connected the address signal line, the data signal line, the memory status signal line (memory busy), and the acknowledge signal line. Table 1 shows the addresses of the memories A2-2, B2-3 and C2-4 accessed from the multibus line 12-14, and the address of the internal bus converted by the memory controller 4-1.

TABLE 1

| | Multibus Memory | | |
|---|---|---|---|
| | Bank | Address | Internal Bus Memory |
| Memory A2-2 | 0 | 0A000 to 89FFE | 00000 to 3FFFF |
| Memory B2-3 | 0 | 8A000 to BB2FE | 40000 to 5897F |
| | 1 | 0B300 to 59FFE | 58980 to 7FFFF |
| Memory C2-4 | 1 | 5A000 to BC5FE | 80000 to B12FF |

FIG. 18 shows the circuit diagram of the memory controller 2-1 in the page memory 12-3. 12-bit shift registers 2-1-1 and 2-1-2 are of serial-in parallel-out type. This image information of 3,456 bits per serial scanning line from the CCD on a line 2-1-4 is transmitted through a 12bit write data line 2-1-3. A line 2-1-5 is for a clock signal for serially inputting a selection signal of the register 2-1-1, 12 bits of the image information on the line 2-1-4, an output enable signal for parallel output of 12-bit information on the line 2-1-4, and an output enable signal for parallel output of 12-bit information to the line 2-1-3. A line 2-1-6 is for a control signal for the register 2-1-2 which has the same function as the line 2-1-5. Based on a write sync signal (at the head of the serial signals of each line) synchronous with the image signal from the CCD and the write clocks, a write timing generator 2-1-7 selects the register 2-1-1 and supplies clocks to this register. Then, the initial 12 bits of the image information corresponding to one page which is input continuously is input to the register 2-1-1. Thereafter, the write timing generator 2-1-7 selects the register 2-1-2 for the next 12-bit image information. The write timing generator 2-1-7 supplies clocks to this register to input this image information in this register 2-1-2. While the image information is input to the register 2-1-2, the write timing generator 2-1-7 supplies an output enable signal to the register 2-1-1 to make it output the stored image information to the memory input line 2-1-3.

The write timing generator 2-1-7 generates the timing signals to the lines 2-1-5 and 2-1-6 and so that the content in the register 2-1-2 is parallel output while the data is serially input to the register 2-1-1 and the content of the register 2-1-1 is parallel output while the data is serially input to the register 2-1-2. With this construction, the serial image information from the reader 1 corresponding to one page may be parallel input to the memory without any stop. At the timing at which the data is parallel output from the register to the line 2-1-3, the address of the memory for storing the data must be on the address bus line of the internal bus 2-6. For this reason, the write timing generator 2-1-7 generates clock pulses to the line 2-1-8 which are counted up to provide the desired address at the timing at which the value of the address counter 2-1-9 reaches the timing of the parallel output. Thus, 12 clock pulses must be generated for each interval during which the data is output alternately between the two shift registers 2-1-1 and 2-1-2 so that this address changes 00000, 0000C, 00018, and so on. The write timing generator 2-1-7 must also generate a memory write signal to the control bus line of the internal bus 2-6 at the timing at which the data is output on the line 2-1-3. Therefore, the 12bit shift registers 2-1-1 and 2-1-2 are parallel-in serial-out shift register of 12 bit capacity which parallel inputs the 12-bit parallel image information read out from the memory and which serially outputs it to the line 2-1-14. During serial output of the information stored in the register 2-1-12 based on the read horizontal hold signal (a beam detect signal in the laser beam printer) and a read clock, a read timing generator 2-1-15 generates a load signal for reading out data on the line 2-1-13 and for loading the readout data in the register 2-1-11i and also generates a clock signal for shifting the loaded data after completion of serial output from the register 2-1-11 and for serial input of the data on the line 2-1-14.

For reading the data on the line 2-1-13, an address must be available to the address line of the internal bus 2-6. Thus, clock pulses are generated to the line 2-1-18 so that the address counter 2-1-9 reaches the value of the desired address prior to the output of the data to the line 2-1-13. Thus, 12 clock pulses must be generated for each interval during which the data is output alternately between the two shift registers 2-1-11 and 2-1-12 so that this address may change 00000, 0000C, 00018, and so on. The read timing generator 2-1-15 must also generate, to a line 2-1-19, a memory read signal on the control bus line of the internal bus 2-6 at the timing at which the address is output. An address converter 2-1-20 comprises a ROM which converts the multibus address into the internal bus address as in Table 1. When the buffer memory 2 is accessed through the multibus line 12-14 by the DMA controller 9, the address information is supplied to a line 2-1-21 together with the bank switch signal. Then, the address converter 2-1-20 outputs, to a line 2-1-22, a selection signal representing which of the memories A2-1, B2-2 and C2-3 is selected based on the received information; it outputs, to a line 2-1-24, a signal to enable these signals to be on the control bus line of the internal bus only when the page memory 2 is accessed. In this case, the data information of the multibus line 12-14 is output through a line 2-1-25 at the same timing as that of the address information. During memory write, the data information is output through the line 2-1-3 to the data bus line of the internal bus 2-6. During memory readout, the data on the data bus line of the internal bus 2-6 is output through the line 2-1-25 to the data bus line of the multibus line 12-14.

As has been described hereinbefore, for inputting the serial image information from the CCD, initial addresses such as 00000, 00001, 00002 to 0000B are present in the address counter 2-1-9 by the CPU circuit block 12-1 through the multibus line 12-14. The preset value is obtained on a data line 2-1-27 through the line 2-1-25. The signal obtained by decoding this address is input to the line 2-1-26 as a chip selection signal of the address counter 2-1-9.

An IO write command on the control bus of the multibus line 12-14 is supplied to a line 2-1-28 to be gated by the chip selection signal. When the chip selection is made, the data on the line 2-1-3 is parallel loaded to the address counter 2-1-9 according to this command signal. After the initial value is loaded, the address counter 2-1-9 counts clock pulses from the line 2-1-8 or 2-1-18. As in the case of the address converter 2-1-20, the memory selection signal is output from the address counter to the line 2-1-22 and the address in the memory is output to the line 2-1-23. The memory write command signal and the memory read command signal are output to the line 2-1-30 when the CPU circuit block 12-1 or the DMA controller 9 accesses the memory. Only when the signal of the line 2-1-24 is gated and the page memory 2 is accessed, the command signal is output to the line 2-1-31. A memory write/read signal is output to a line 2-1-32 when one signal is output to one of the lines 2-1-10, 2-1-19 and 2-1-31. A line 2-1-33 is for a memory busy signal MB (indicates that the memory is in the read or write operation) which is output from the memories A2-1, B2-2 and C2-3 to the control bus line of the internal bus 2-6, and for a memory cycle enable signal MCE (indicates that the memory is in the read, write, or refresh operation). When a refresh trigger signal is received from the CPU circuit block 12-1, a refresh controller 2-1-35 confirms that this signal is neither of the signals MCE and MB and then outputs, to a line 2-1-34, 128 refresh pulses of about 500 nsec period, which is sufficient for refreshing.

In this manner, the competition between the refresh pulses and the pulses for memory access in the dynamic memory may be prevented.

In summary, according to the present invention, an image processing system is provided which is capable of high speed image processing with ease.

FIGS. 19 and 20 are flow charts of the operation of the image processing system of the present invention. FIG. 19 shows the operation of the CPU 8085 of the reader & printer sequence controller shown in FIG. 12, which is set to the ROM of the reader & printer sequence controller. FIG. 20 shows the operation of the CPU 8086 of the CPU shown in FIG. 11, which is set to the ROM of the CPU.

When the system is turned on, the program of the CPU 8086 advances to step S201 and waits for an interruption (A) from the CPU 8085 through the interruption line 12-17.

The CPU 8085, in step S101, reads through the interface 12-6 the application file name and the desired number of duplicates which are input as numerical information through the control panel 13 shown in FIG. 8. The CPU 8085 writes the information in the RAM of the reader & printer sequence controller. Thereafter, the program advances to step S102 to wait for the operation of the EXCUT key 13-5 of the control panel 13.

When the EXCUT key 13-5 is depressed by the operator, the CPU 8085 advances to step S103 and waits for an interruption (B) by addressing from the CPU 8086.

When the EXCUT key 13-5 is in operation, the CPU 8085 interrupts (B) the operation of the CPU 8086. When the CPU 8086 discriminates the interruption (B) in step S201, it advances to step S202. In step S202, the CPU 8086 reads out the file name of the desired application file written in the RAM of the reader & printer sequence controller and writes it in the RAM of the CPU. In step S203, the directory of the file name of the application file for the image processing, which is stored and registered in the disk memory 4 in advance, is loaded in the RAM of the CPU. In step S204, it is discriminated if the desired application file is present in the directory.

When the desired application file is not present, the program advances to step S205 wherein an error code is written in the RAM of the reader & printer sequence controller. The program then returns to step S201 to wait for another interruption (A). The CPU 8086 also interrupts (B) the CPU 8085 simultaneously as it writes the error code.

When the CPU 8085 receives this interruption (B) in step S103, the CPU 8085 advances to step S104. In step S104, the CPU 8085 searches for the code in the RAM of the reader & printer sequence controller. Since in step S105, the error code is determined to be written in the RAM, the CPU 8085 advances to step 106. The APC display 13-7 of the control panel 13 indicating that the application file of. the input file name is not registered is lit. Then, the program returns to step S101 to wait for another key input.

On the other hand, if the desired application file name is in the directory, the CPU 8086 advances to step S206. In step S206, the application file stored in the disk and corresponding to the input file name is loaded in the RAM of the CPU. The program advances to step S207 to sequentially read the character strings of the application file. In steps S208 to S212, the one-character commands and the sequentially read carriage return signals of the application file are discriminated and corresponding processing is performed.

In step S208, the carriage return signal is discriminated. The carriage return signal is a carriage return command signal for display of the application file at the application buffer 7-3 of the CRT 7. After a carriage return as a result of the discrimination in step S208, subsequent carriage return signals are invalid and only the carriage return signal at the end of the image file is effective. Thus, in step S208, it is discriminated if the readout of the image file is completed.

If a carriage return signal is discriminated in step S208, the program advances to step S213 wherein the end code of the readout of the application file is written in the RAM of the reader & printer sequence controller. The program then returns to step S201 to wait for another interruption.

Simultaneously with the writing of the end flag of readout, the CPU 8086 interrupts (B) the CPU 8085.

When the CPU 8085 discriminates the interruption (B), it advances tp step S104 wherein it searches for the code in the RAM of the reader & printer sequence controller. Since there is no error code, reader drive code, or printer drive code in this case, the program returns to step S101 through steps 105, 107 and 108 to wait for another key input.

If the one-character command read out next is "R" which indicates the readout of the original, the CPU 8086 advances from step S209 to step S214. In step S214, the CPU 8086 writes the reader drive code in the RAM of the reader & printer sequence controller.

Simultaneously with the writing of the reader drive code, the CPU 8086 interrupts (B) the CPU 8085.

When the CPU 8085 discriminates the interruption (B), it advances to step S104 to search for the code in the RAM. Since the reader drive code is written in the RAM, the program advances from step S107 to step S118 wherein the reader drive motor forward on command is output to the scanning motor drive of the printer 3 to start readout of the original. When it is confirmed in step S119 that the scanning of the original with the reader has been completed at a reverse position, the forward drive of the reader drive motor is turned off in step S120 and a backward on command is output. The CPU 8085 also sets the reader drive end flag in the RAM of the reader & sequence controller. The CPU 8085 also interrupts (C) the CPU 8086. When the CPU 8085 confirms in step S121 that the reader has returned to the home position, the CPU 8085 turns off the reader drive motor in step S122. The program then advances to step S103 to wait for another interruption (B). When the CPU 8086 discriminates the interruption (C) and confirms, in step S212, that the reader drive end flag is set in the RAM of the reader & printer sequence controller, the program returns to step S207 and reads the subsequent character strings.

If the one-character command readout is "P" which indicates the output by the printer, the CPU 8086 advances from step S210 to step 216 and writes the printer drive code in the RAM of the reader & printer sequence controller.

Simultaneously with the writing of the printer drive code, the CPU 8086 interrupts (B) the CPU 8085.

When the CPU 8085 discriminates the interruption (B), the program advances to step S104 to search for the code in the RAM. Since the printer drive code is written in the RAM, the program advances from step S108 to step S109. Steps S109 to S117 are for the known printing operation. That is, in step S109, the forward rotation for preparation of printing is performed. When it is discriminated in step, S110 that this forward rotation is ended, the recording sheet is fed in step S111. After a predetermined period of time elapses in step S112, the program advances to step S113 wherein the output of the image information for one page which is stored in the page memory 2 is instructed. The printer 3 performs the printing operation according to this image information.

When the CPU 8085 discriminate that the printing operation for one page is ended in step S114, the program advances to step S115. In step S115, it is discriminated if the printing operation for the desired number of duplicates written in the reader & printer sequence controller is ended. If the desired printing operation is not ended, the program returns to step S111 to repeat the printing operation. If the desired printing operation is ended, the program advances to step S116 to set the print end flag in the RAM of the reader & printer sequence controller.

Simultaneously with setting of the printing flag, the CPU 8085 interrupts (D) the CPU 8086. In step S117, the backward rotation cycle is performed. Then, the program returns to step S103 and waits for another interruption (B) from the CPU 8086.

When the CPU 8086 discriminates the interruption (D) and confirms, in step S217, that the print end flag is set in the RAM of the reader & printer sequence controller, it returns to step S207 to read the subsequent character strings.

If the one-character command read out is "S" which instructs the storage of the image information from the page memory 2 into the disk memory 4, the CPU 8086 advances to step S218. In step S218, the CPU 8086 reads the two characters after "(" of the character string as the file name of the image file and the subsequent numeral as the information on the position and size as described above, and calculates the address of the page memory 2 from these values. The program then advances to step S219, and it DAM-transfers and stores the image information of the page memory corresponding to the address region set in step S218 in the disk memory. The program then returns to step S207 to read the subsequent character strings.

If the one-character command read out is "L" which instructs loading of the image file in the page memory 2, the program advances from step S212 to S220. In step S220, the two characters after "(" of the character string are read out as the file name of the image file, and the subsequent numeral is read out as the position information. In step S221, the index part of the image file of the file name read out in step S220 is loaded in the RAM of the CPU from the disk memory. Then, in step S222, the address to which the image file of the page memory is to be transferred is calculated based on the size information of the index loaded in the RAM and the position information read out in step S220. In step S223, the image file of the file name read out in step S220 is loaded in the address region calculated in step S222. The program then returns to step S207 and reads the subsequent character strings.

What we claim is:

1. An image processing apparatus comprising:

scan means for scanning an image of an original;

recording means for recording the image on a recording material;

output means, having a coordinate input plane corresponding to the original, for outputting coordinate information representative of a desired area of the original that is specified with a pointing device; and display means for, in accordance with the coordinate information output from said output means, displaying numerical coordinates indicating the position of the desired area of the original specified with the pointing device, and also graphically displaying the desired area of the original defined by the coordinate information, wherein said recording means records on the recording material the image in the desired area of the original which is numerically and graphically displayed on said display means.

2. An image processing apparatus according to claim 1, wherein said display means graphically displays outlines of the original and the desired area of the original.

3. An image processing apparatus according to claim 1, wherein said display means distinguishes in color the desired area from areas other than the desired area.

4. An image processing apparatus according to claim 1, wherein said display means displays an area to be recorded by said recording means.

5. An image processing apparatus according to claim 1, wherein said recording means comprises a laser beam printer.

6. An image processing apparatus according to claim 1, wherein said display means comprises a monitor.

7. An image processing method comprising the steps of:

scanning an image of an original;

recording the image on a recording material;

outputting coordinate information representative of a desired area of the original that is specified with a pointing device; and displaying numerical coordinates indicating the position of the desired area of the original specified with the pointing device, and also graphically displaying the desired area of the original defined by the coordinate information, in accordance with the coordinate information output in said outputting step, wherein, in said recording step, the image in the desired area of the original which is numerically and graphically displayed in said displaying step, is recorded on the recording material.

8. An image processing method according to claim 7, wherein, in said displaying step, outlines of the original and the desired area of the original are graphically displayed.

9. An image processing method according to claim 7, wherein said displaying step is performed in such manner that the display distinguishes in color the desired area from areas other than the desired area.

10. An image processing method according to claim 7, wherein, in said displaying step, an area to be recorded by said recording means is displayed.

11. An image processing method according to claim 7, wherein said recording step is performed using a laser beam printer.

12. An image processing method according to claim 7, wherein said displaying step is performed using a monitor.

13. An image processing apparatus comprising:

input means for inputting image data representing an original image from an image source device;

output means for outputting image data to an image output device;

designating means for designating an area of the original image to be processed and for providing area information representative of the designated area;

display means for, in accordance with the area information provided by said designating means, displaying numerical coordinates indicating the position of the desired area of the original image specified by said designating means, and graphically displaying the designated area; and process means for processing image data input by said input means in accordance with the area information provided by said designating means and for outputting the processed image data by said output means.

14. An image processing apparatus according to claim 13, wherein said display means graphically displays outlines of the original image and the designated area.

15. An image processing apparatus according to claim 13, wherein said display means displays the inside of the designated area and the outside of the designated area with mutually different colors.

16. An image processing apparatus according to claim 13, wherein said process means comprises extracting means for extracting image data of the designated area from the image data input by said input means.

17. An image processing apparatus according to claim 13, wherein said designating means has a pointing device and a coordinate input plane corresponding to the original image and provides coordinate information representative of the desired area with the pointing device.

18. An image processing apparatus according to claim 13, wherein the image source device is a scanning device which scans the original image and generates the image data representing the original image.

19. An image processing apparatus according to claim 13, wherein the image output device is a recording device which records an image on a recording material based on the image data.

20. An image processing method comprising the steps of:

inputting image data representing an original image from an image source device;

designating an area of the original image to be processed;

providing area information representative of the designated area;

displaying numerical coordinates indicating the position of the designated area of the original image designated in said designating step, and graphically displaying the designated area, in accordance with the area information provided in said providing step;

processing image data input in said inputting step in accordance with the area information provided in said providing step; and outputting the processed image data to an image output device.

21. An image processing method according to claim 20, wherein in said displaying step, outlines of the original image and the designated area are graphically displayed.

22. An image processing method according to claim 20, wherein in said displaying step the inside of the designated area and the outside of the designated area are displayed with mutually different colors.

23. An image processing method according to claim 20, wherein said processing step comprises an extracting step of extracting image data of the designated area from the image data inputting by said inputting step.

24. An image processing method according to claim 20, wherein, in said designating step, coordinate information representative of the desired area is provided in accordance with an instruction generated on a coordinate input plane with a pointing device.

25. An image processing method according to claim 20, wherein the image source device is a scanning device which scans the original image and generates the image data representing the original image.

26. An image processing method according to claim 20, wherein the image output device is a recording device which records an image on a recording material based on the image data.

* * * * *

UNITED STATES PATENT AND TRADEMARK OFFICE
CERTIFICATE OF CORRECTION

PATENT NO. : 5,864,407                                      Page 1 of 5

DATED      : January 26, 1999

INVENTOR(S): KATSUICHI SHIMIZU, ET AL.

It is certified that error appears in the above-identified patent and that said Letters Patent is hereby corrected as shown below:

On the title page,

Related U.S. Application Data [63]

"which is a continuation of Ser. No. 647,414, Sep. 5, 1984, abandoned," (second occurrence) should be deleted.

References Cited [56]

FOREIGN PATENT DOCUMENTS

"5544282" should read --55-44282--.

ABSTRACT [57]

Line 9, "convesation" should read --conversation--.

SHEET 8

FIG. 6, "m1" should read --n1--, and "m2" should read --n2--,

UNITED STATES PATENT AND TRADEMARK OFFICE
CERTIFICATE OF CORRECTION

PATENT NO. : 5,864,407

DATED : January 26, 1999

INVENTOR(S) : KATSUICHI SHIMIZU, ET AL.

It is certified that error appears in the above-identified patent and that said Letters Patent is hereby corrected as shown below:

SHEET 26

FIG. 19B, "REVESE POSITION" should read --REVERSE POSITION--, and "REDER" should read --READER--.

SHEET 28

FIG. 20A, "ACCEES" should read --ACCESS--.

SHEET 29

FIG. 20B, "FLAGE" should read --FLAG--.

SHEET 30

FIG. 20C, "PARAN THE" should read --PARANTHE--.

COLUMN 3

Line 7, "FIGS. 6," should read --FIG. 6,--.
    Line 44, "FIG." should read --FIGS.--.
    Line 56, "CCD which," should read -- CCD, which--.

COLUMN 8

Line 25, "01.0) should read --01.0).--.

UNITED STATES PATENT AND TRADEMARK OFFICE
CERTIFICATE OF CORRECTION

PATENT NO. : 5,864,407

DATED : January 26, 1999

INVENTOR(S) : KATSUICHI SHIMIZU, ET AL.

It is certified that error appears in the above-identified patent and that said Letters Patent is hereby corrected as shown below:

COLUMN 10

Line 23, "shown-in" should read --shown in--.

COLUMN 11

Line 50, "DMA 27" should read --DMA--.

COLUMN 12

Line 2, "to.the" should read --to the--.
    Line 11, "Ser." should read --Serial--.

COLUMN 13

Line 25, "herein-before," should read --hereinbefore,--.

COLUMN 15

Line 8, "9-5." should read --9-5--.
    Line 66, "the-word" should read --the word--.

UNITED STATES PATENT AND TRADEMARK OFFICE
CERTIFICATE OF CORRECTION

PATENT NO. : 5,864,407

DATED : January 26, 1999

INVENTOR(S): KATSUICHI SHIMIZU, ET AL.

It is certified that error appears in the above-identified patent and that said Letters Patent is hereby corrected as shown below:

COLUMN 18

Line 7, "FFFFF" should read --FFFFF,--.
    Line 40, "4k byte" should read --4-k byte--.
    Line 43, "4k byte" should read --4-k byte--.

COLUMN 21

Line 21, "is" should read --are--.
    Line 47, "16-bits" should read --16-bit--.

COLUMN 22

Line 31, "12bit" should read --12-bit--.

COLUMN 23

Line 9, "12bit" should read --12-bit--.
    Line 18, "2-1-11i" should read --2-1-11,--.

COLUMN 25

Line 5, "of." should read --of--.
    Line 33, "tp" should read --to--.

UNITED STATES PATENT AND TRADEMARK OFFICE
CERTIFICATE OF CORRECTION

PATENT NO. : 5,864,407

DATED : January 26, 1999

INVENTOR(S) : KATSUICHI SHIMIZU, ET AL.

It is certified that error appears in the above-identified patent and that said Letters Patent is hereby corrected as shown below:

<u>COLUMN 26</u>

Line 11, "step," should read --step--.
    Line 18, "discriminate" should read "discriminates--.

<u>COLUMN 28</u>

Line 67, "inputting" (first occurrence) should read --input--.

Signed and Sealed this

Sixth Day of June, 2000

Attest:

Q. TODD DICKINSON

*Attesting Officer*    *Director of Patents and Trademarks*